US012679187B2

(12) United States Patent　　　　　(10) Patent No.:　US 12,679,187 B2
Dylewski, II et al.　　　　　　　　　　(45) Date of Patent:　　　Jul. 14, 2026

(54) TONNEAU COVER EXTENSION

(71) Applicant: Leer Group, Elkhart, IN (US)

(72) Inventors: Eugene A. Dylewski, II, Granger, IN (US); Michael A. Sislo, Dexter, MI (US); Donald Richard Ireland, Middlebury, IN (US)

(73) Assignee: Truck Accessories Group, LLC, Elkhart, IN (US)

( * ) Notice: Subject to any disclaimer, the term of this patent is extended or adjusted under 35 U.S.C. 154(b) by 584 days.

(21) Appl. No.: 18/180,961

(22) Filed: Mar. 9, 2023

(65) Prior Publication Data

US 2023/0286362 A1　　　Sep. 14, 2023

Related U.S. Application Data

(60) Provisional application No. 63/319,549, filed on Mar. 14, 2022.

(51) Int. Cl.
B60J 7/14　　　　(2006.01)
B60J 7/10　　　　(2006.01)

(52) U.S. Cl.
CPC .............. B60J 7/141 (2013.01); B60J 7/104 (2013.01)

(58) Field of Classification Search
CPC ....... B60J 7/14; B60J 7/141; B60J 7/16; B60J 7/1607; B60J 7/041; B60J 7/104; B62D 35/00; B62D 35/007
USPC ........... 296/100.06, 100.07, 100.08, 100.09, 296/100.02, 180.1, 180.2
See application file for complete search history.

(56) References Cited

U.S. PATENT DOCUMENTS

| | | | |
|---|---|---|---|
| 9,108,685 B1 | 8/2015 | Froling et al. | |
| 2018/0345768 A1 | 12/2018 | Frederick et al. | |
| 2019/0126734 A1* | 5/2019 | Dylewski | B60J 7/198 |
| 2021/0016646 A1* | 1/2021 | Dylewski | B60J 7/141 |

FOREIGN PATENT DOCUMENTS

| | | |
|---|---|---|
| WO | 2018/018962 A1 | 2/2018 |
| WO | 2021011602 A1 | 1/2021 |

OTHER PUBLICATIONS

IStatement of Admitted Prior Art executed by Gene Dylewski at Leer Group on May 10, 2024.
Photo of Bedslide Tie Down Ring, Not Dated.
European Search Report 24166034.9-1009 / 4371860; Leer Group; Dated Jun. 4, 2024.
International Search & Written Opinion; Date of Mailing Jun. 22, 2023; PCT/US2023/015062; Leer Group; "Tonneau Cover Extension".

* cited by examiner

*Primary Examiner* — Amy R Weisberg
*Assistant Examiner* — Denise Lynne Esquivel
(74) *Attorney, Agent, or Firm* — Barnes & Thornburg LLP

(57)　　　　　ABSTRACT

A tonneau cover assembly that includes at least one panel section and an extension panel. The at least one panel section selectively shrouds at least a portion of an opening of a cargo box. The at least one panel section is movable with respect to the opening. The extension panel coupled to the at least one panel section and is movable between a use position and a stowed position. When in the use position, at least a portion of the extension panel extends from the at least one panel section and exterior of the cargo box.

19 Claims, 24 Drawing Sheets

TONNEAU COVER EXTENSION

RELATED APPLICATIONS

The present application relates to and claims priority to U.S. Provisional Patent Application, Ser. No. 63/319,549, filed on Mar. 14, 2022. The subject matter disclosed in that Provisional Application is hereby expressly incorporated into the present application.

TECHNICAL FIELD AND SUMMARY

The present disclosure relates to pickup trucks and truck beds or cargo boxes, and, in particular, cargo box covers, also known as tonneau covers, used on such cargo boxes that include extension features.

Tonneau covers are truck bed or cargo box covers that provide a covering for a truck bed when used in combination with the truck's sidewalls and tailgate. Covering the bed of a pickup truck helps create a secure compartment where items may be stored out of view when the tailgate is in an upright and latched position. Embodiments of a tonneau cover may include the cover portion that is suspended over the truck bed between the sidewalls. Typically, a rail assembly may be employed that attaches to the opposing sidewalls to secure the cover onto the truck.

An illustrative embodiment of the present disclosure provides a tonneau cover assembly that comprises a cover, extension panel, and at least one support. The cover includes at least one panel section. The at least one panel section selectively shrouds at least a portion of an opening of a cargo box. The at least one panel section is movable with respect to the opening. The extension panel is coupled to the at least one panel section. The extension panel is movable between a use position and a stowed position. When in the use position, at least a portion of the extension panel extends from the at least one panel section and exterior of the cargo box. When in the stowed position, the extension panel is located within the cargo box. When in the use position, an end of the extension panel is located adjacent an end of the at least one panel section. When in the stowed position, the extension panel is located underneath the at least one panel section. The at least one support is located underneath the extension panel when in the use position and exterior of the cargo box.

In the above and other embodiments, the tonneau cover assembly also comprises: a hinge being coupled to the extension panel and to the at least one panel section, the extension panel being movable with respect to the at least one panel section between the stowed position and the use position; a receiver that holds at least a portion of the at least one support when the extension panel is located in the use position; the receiver being attached to the cover; the receiver being configured to attach to a rail that is attached to the cargo box; the at least one support includes a post that is extendable into the receiver when the extension panel is located in the use position; a second support located underneath the extension panel when in the use position, exterior of the cargo box, and spaced apart from the at least one support; the at least one support is removable from the tonneau cover assembly; a release assembly that extends from underneath the at least one panel section adjacent the hinge, wherein the hinge does not interfere with operation of the release assembly; the at least one panel section being a tailgate panel; at least a part of the at least one support being extendable from the receiver when the at least one panel section is in the use position and retractable toward the receiver when the at least one panel section is in the stowed position; and the receiver is coupled to the cover.

Another illustrative embodiment of the present disclosure provides a tonneau cover assembly that comprises a cover and an extension panel. The cover includes at least one panel section. The at least one panel section selectively shrouds at least a portion of an opening of a cargo box. The at least one panel section is movable with respect to the opening. The extension panel is coupled to the at least one panel section and movable between a use position and a stowed position. When in the use position, at least a portion of the extension panel extends from the at least one panel section and exterior of the cargo box.

In the above and other embodiments, the tonneau cover assembly also comprises: when in the stowed position the extension panel is located within the cargo box; when in the use position, an end of the extension panel is located adjacent an end of the at least one panel section; when in the stowed position, the extension panel is located underneath the at least one panel section; and at least one support is located underneath the extension panel when in the use position and exterior of the cargo box.

Another illustrative embodiment of the present disclosure provides a tonneau cover assembly that comprises at least one panel section and an extension panel. The at least one panel section selectively shrouds at least a portion of an opening of a cargo box. The at least one panel section is movable with respect to the opening. The extension panel coupled to the at least one panel section and is movable between a use position and a stowed position. When in the use position, at least a portion of the extension panel extends from the at least one panel section and exterior of the cargo box.

In the above and other embodiments, the tonneau cover assembly also comprises: the extension panel being attachable from the at least one panel section when in the use position and separated from the at least one panel section when in the stowed position.

Additional features and advantages of the tonneau cover extension will become apparent to those skilled in the art upon consideration of the following detail description of the illustrated embodiments exemplifying carrying out the tonneau cover extension as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the tonneau cover extension, and such exemplification is not to be construed as limiting the scope of the tonneau cover extension in any manner.

DETAILED DESCRIPTION OF THE DRAWINGS

Figure 1:
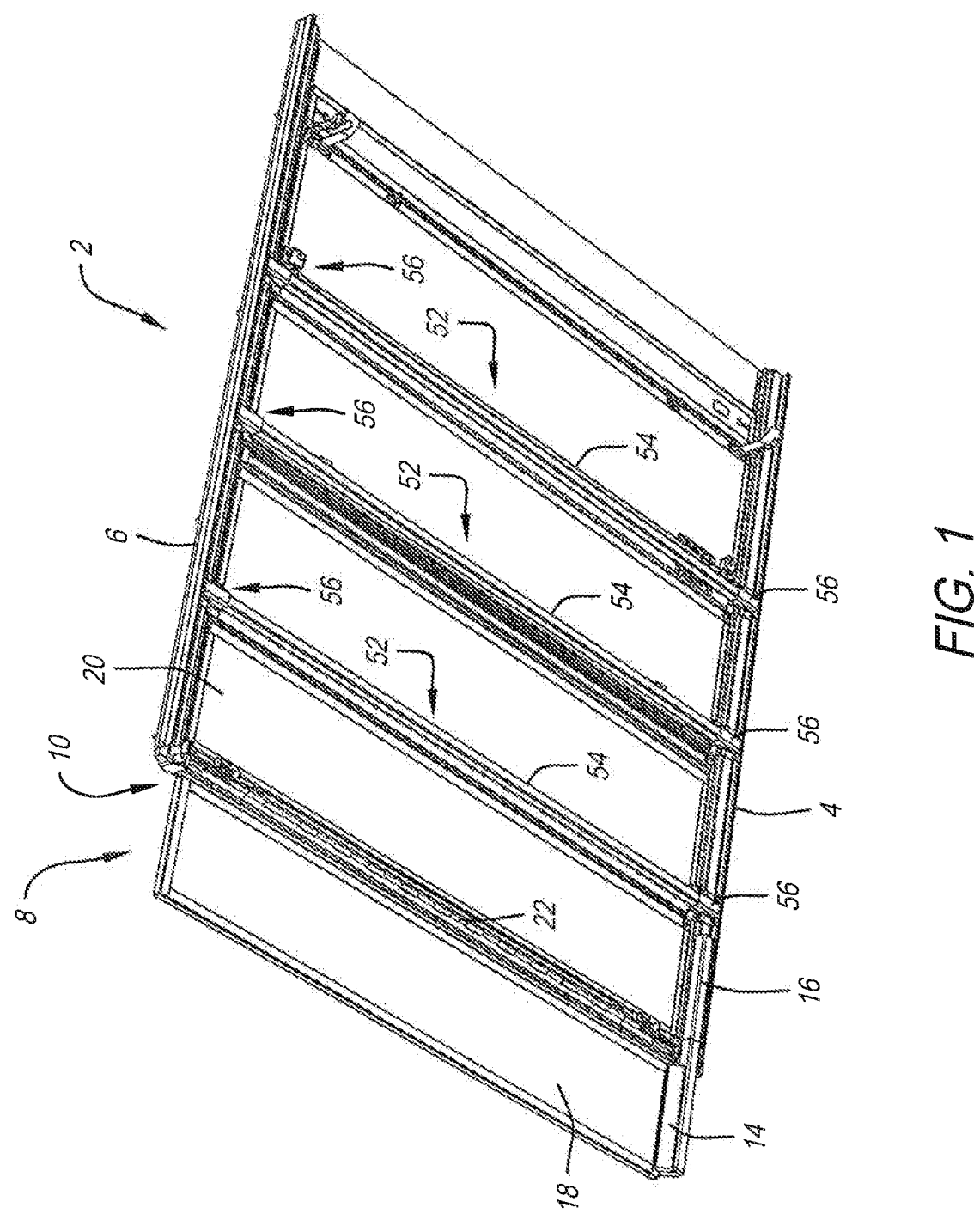
FIG. 1 is an underside perspective view of a tonneau cover supported by opposing rails with an extension panel assembly extending therefrom.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a tonneau cover extension that selectively extends the length of the tonneau cover. Illustratively, an additional cover panel may be selectively attached to the end of the tailgate panel. This extension panel may be movable between a stowed position underneath another panel and an extended use position adjacent the cover. This extension panel may add additional length to the tonneau cover, such as 300 mm or 1 foot, for example, when in its use position. It is appreciated that the extension panel may be constructed to extend any distance from the tonneau cover.

A support insert may be coupled to each rail to support the extension panel when in its use position. An illustrative receiver may be attached to each rail and configured with an opening to receive a portion of the support insert that the extension panel will be seated on while in its use position.

A hinge may be attached to both the extension panel and the tailgate panel to allow the extension panel to pivot therewith. It is appreciated that the hinge will accommodate the latch and release assemblies or other like mechanisms so they can be accessed by conventional means without the extension panel folded in its stowed position getting in the way or obstructing those structures or access to them.

In another illustrative embodiment, support joist assemblies may extend underneath the tonneau cover from one rail to another. Support brackets may be secured to opposing rails and face each other to allow a beam to be supported thereby. It is appreciated that one or more of such beam assemblies may be employed. Such beam assemblies may be located underneath each hinge joint, select hinge joints, one or more panels, or other locations as desired. The support joist assemblies may be removed, particularly the beam, to allow access to the cargo box underneath without any obstruction by the beam.

Additional embodiments of the disclosure include removable extension panel assemblies, sliding extendable tonneau covers, including telescoping rail assemblies, and C-clamps.

Tonneau Cover Extension Panel Assembly

An underside perspective view of a tonneau cover 2, supported by opposing rails 4 and 6, is shown in FIG. 1. This view also shows an extension panel assembly 8 that is hingedly attached to rear end 10 of tailgate panel 20 of tonneau cover 2. A support insert 14 is fitted in a receiver 16 to support extension panel 18 of extension panel assembly 8, Receiver 16 is fixed to rail 4. It is appreciated that a receiver 16 may be attached to each rail 4 and 6 with a support insert 14 fitted therein on each rail 4 and 6 to support each side of extension panel 18. For demonstrative purposes, however, the support insert 14 and receiver 16 is only shown on one side of tonneau cover 2. In other illustrative embodiments where support on each side of the extension panel 18 may not be required, one support insert 14 may be used rather than multiple support inserts. In this and other embodiments herein, when weight is a factor, multiple support inserts 14 and receivers 16, on each side of tonneau cover 2, may be employed. Additionally, supports such as support insert 14 may extend toward the center of extension panel 18 as needed to carry a load.

Figure 2:
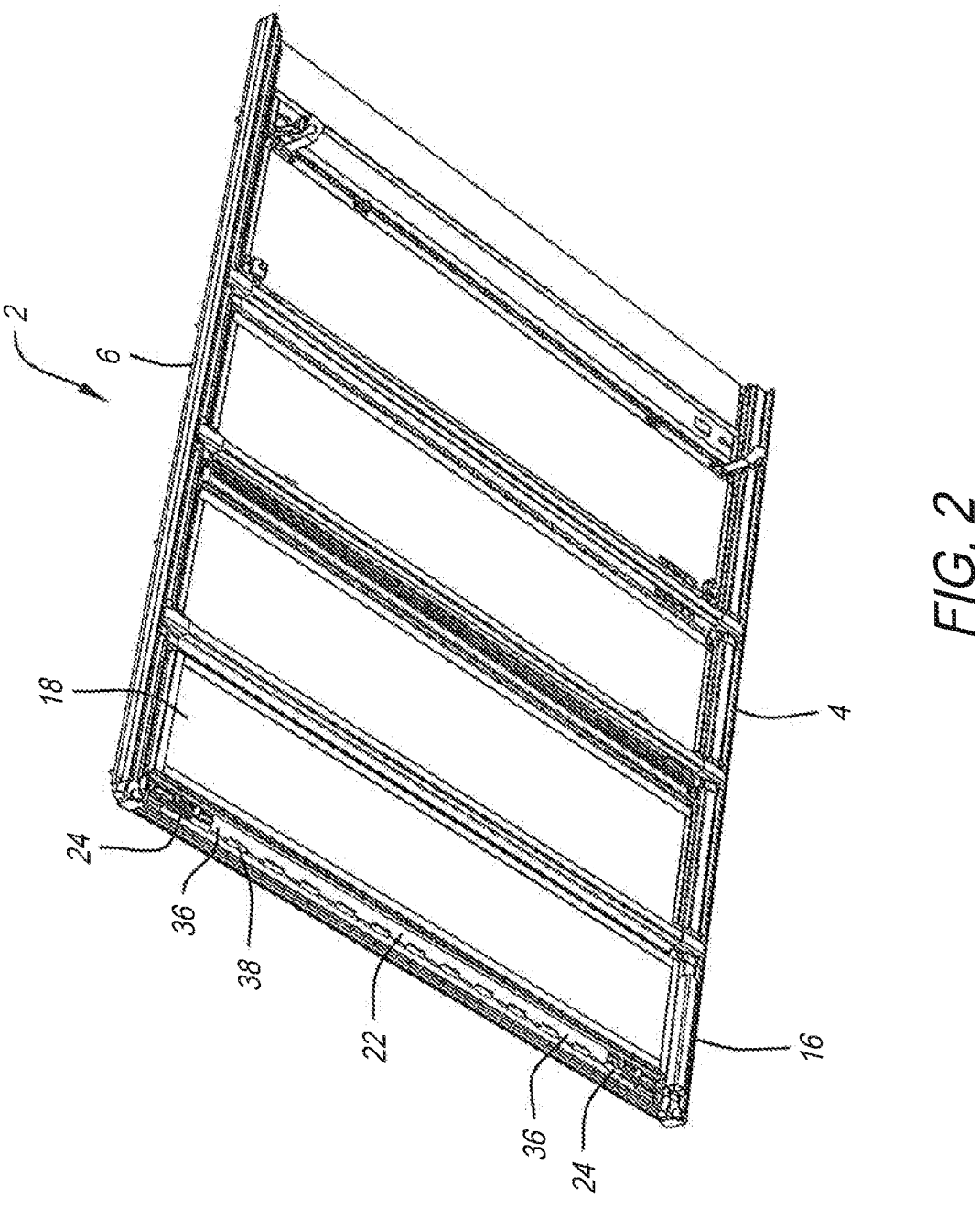
FIG. 2 is another underside perspective view of the tonneau cover with the extension panel located in a stowed position.

Another underside perspective view of tonneau cover 2 is shown in FIG. 2. Here, the extension panel 18 is located in a stowed position underneath tailgate panel 20. This allows tonneau cover 2 to open and close as normal without extension panel 18 creating interference. Additionally, as shown (see, also, FIGS. 3 and 7), latch and release mechanisms 24 are not obstructed by extension panel 18 either. As discussed further herein, hinge 22 accommodates latch and release mechanisms 24, illustratively located on each side of the underside of the tonneau cover.

Figures 3, 4:
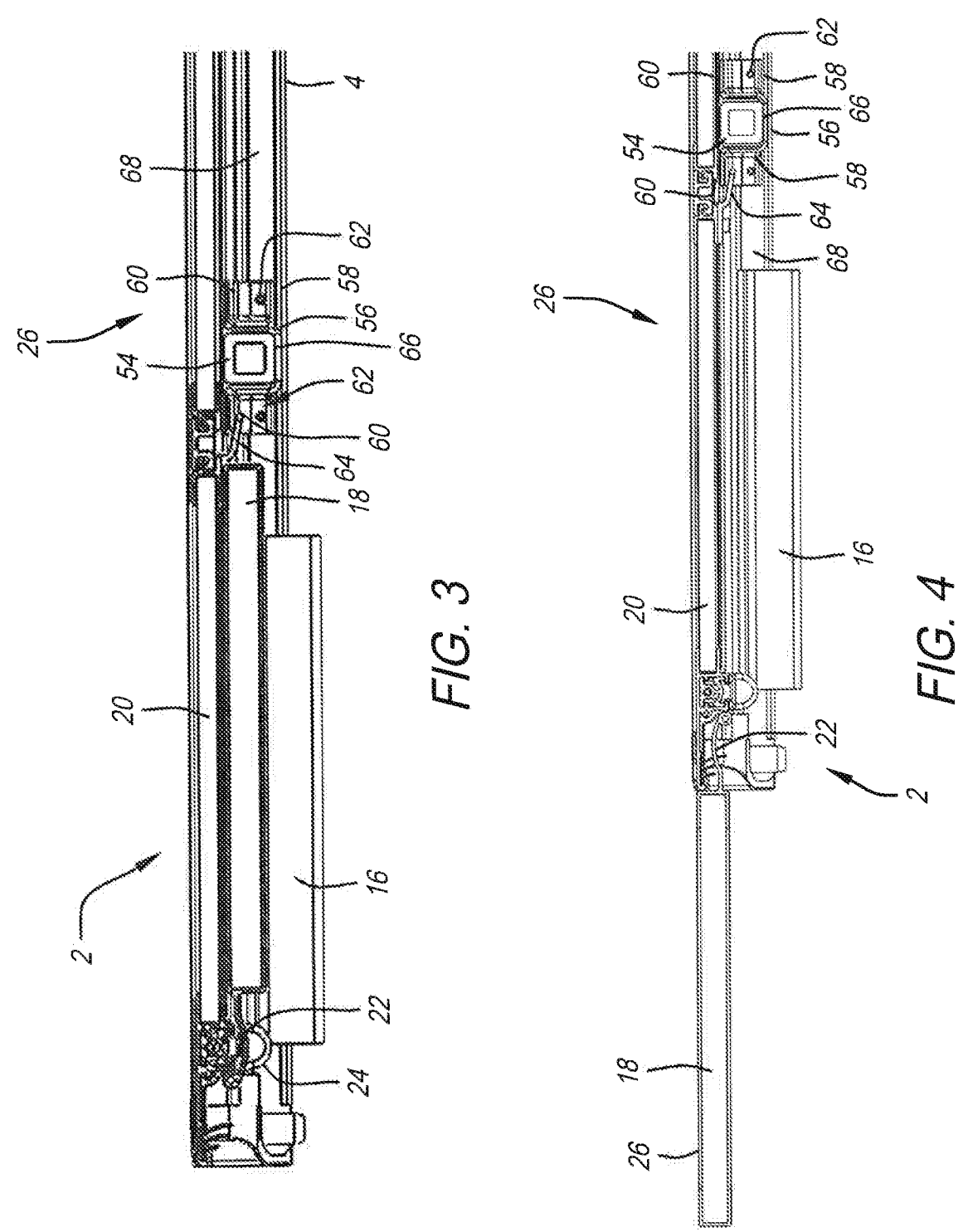
FIG. 3 is a side sectional view of a portion of the tonneau cover with the extension assembly folded underneath.
FIG. 4 is another side sectional view of a portion of the tonneau cover with the extension assembly located in its extended use position.

Side sectional views of the tonneau cover are shown in FIGS. 3 and 4. The view shown in FIG. 3 depicts extension panel 18 folded underneath the tailgate panel 20 via hinge 22 also shown in FIGS. 1 and 2. Latch and release mechanisms 24 are also shown accessible despite extension panel 18 stowed underneath tailgate panel 20. Also shown herein is receiver 16. The view shown in FIG. 4 is similar to FIG. 3 except that extension panel 18 is pivoted to its extended use position adjacent tailgate panel 20 rather than underneath it. This view further depicts hinge pivoting extension panel 18 outward. The result is a longer flat top surface 26 of tonneau cover 2. Extending top surface 26 may have utilities, including an additional workspace surface or a mattress support. The latter of which may require a support surface longer than a traditional tonneau cover length.

Figure 5:
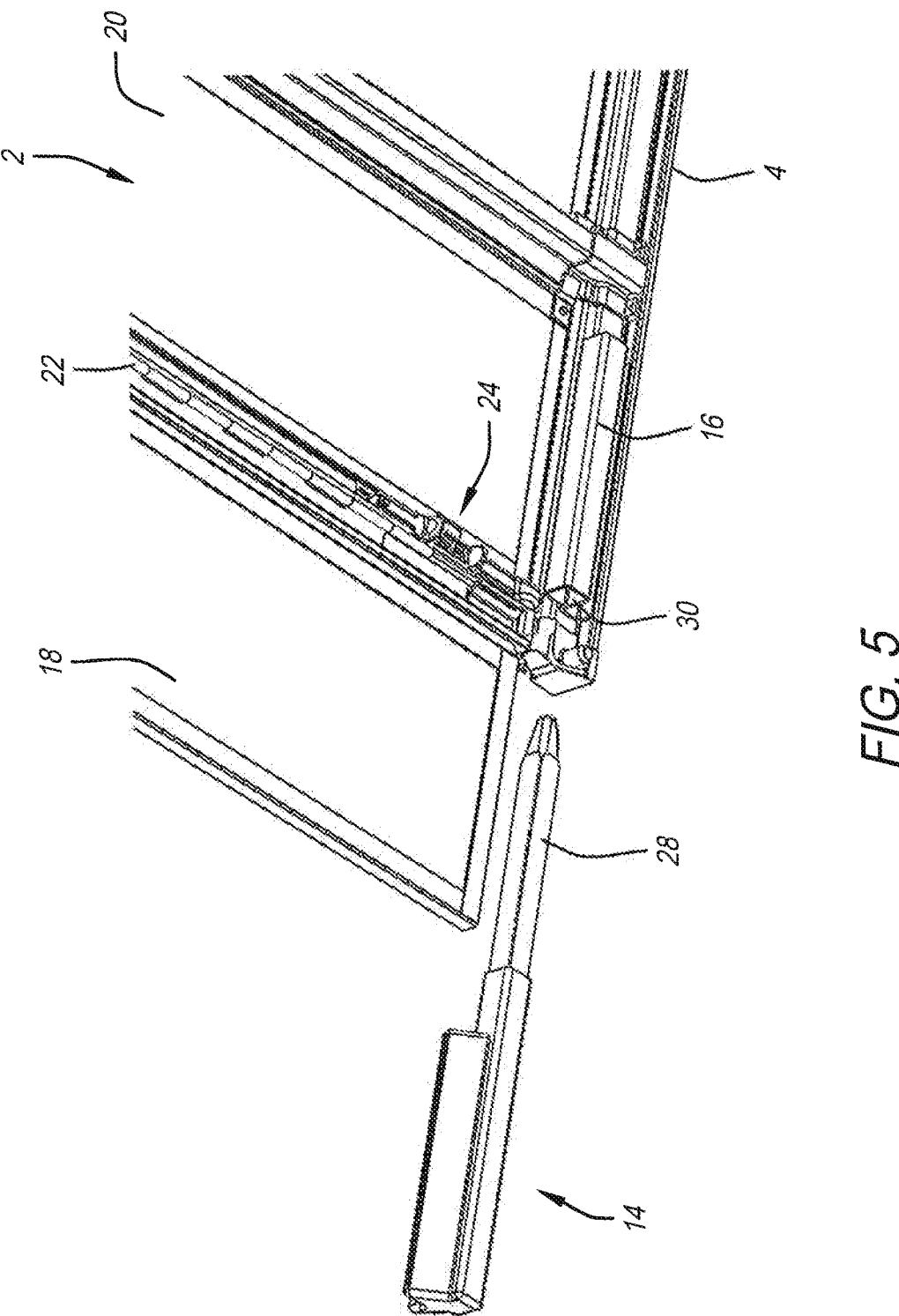
FIG. 5 is a detail perspective underside view of the tonneau cover.

A detail perspective underside view of tonneau cover 2 is shown in FIG. 5. This view depicts support insert 14 spaced apart from receiver 16. Support insert 14 illustratively includes a post 28 configured to be received in opening 30 of receiver 16 as shown in FIG. 1. Support insert 14 is, thus, supported by receiver 16, which is attached to rail 4 in order to support extension panel 18 when in its extended use position, as shown herein. It is again appreciated that support insert 14 and receiver 16 may be located on each of the opposing rails 4 and 6 to support each side of extension panel 18.

Figure 6:
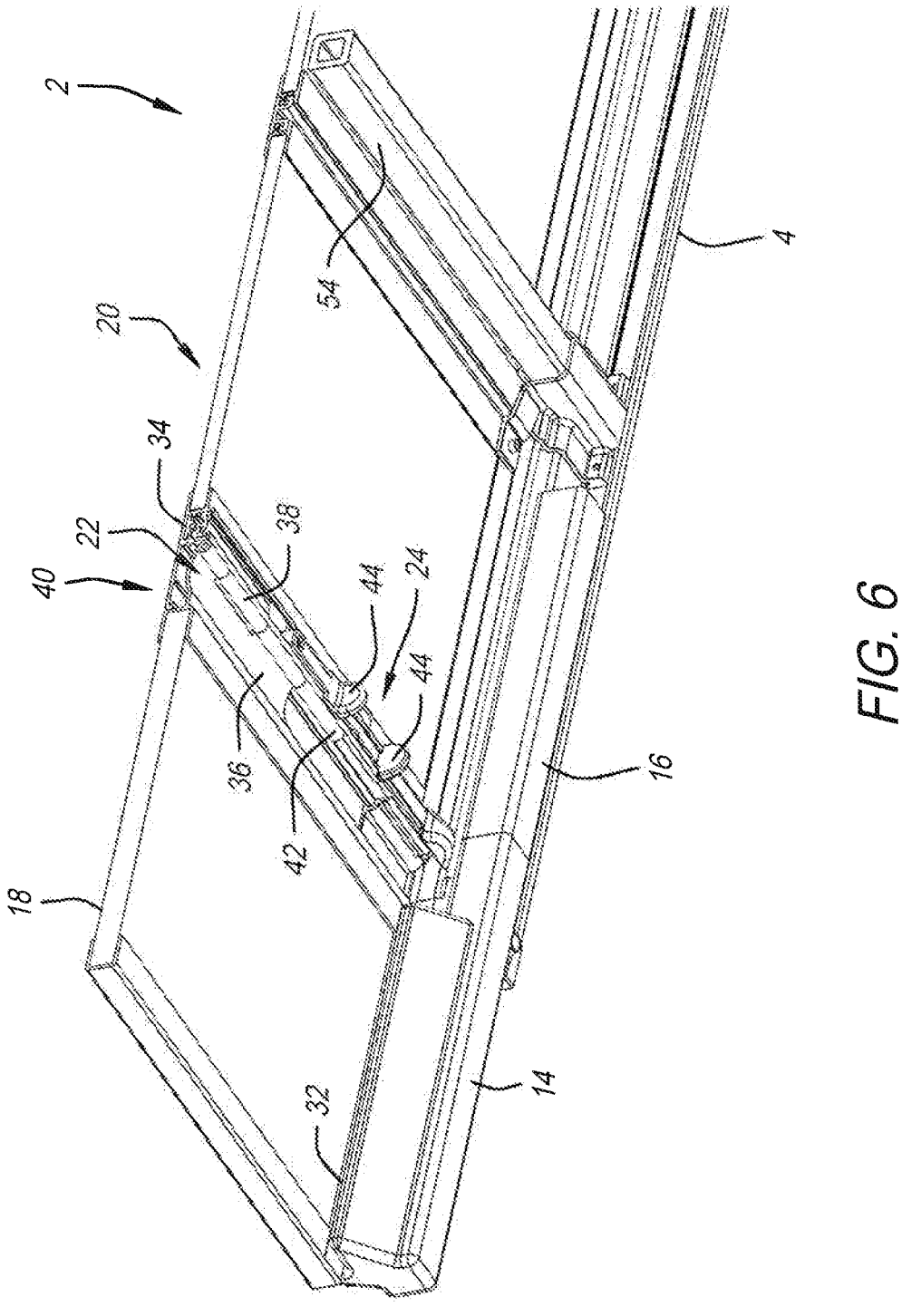
FIG. 6 is another detail underside perspective view of a portion of the tonneau cover.

Another detail underside perspective view of a portion of tonneau cover 2 is shown in FIG. 6. This view depicts support insert 14 fitted into receiver 16 and attached to rail 4. A support surface 32 of support insert 14 receives extension panel 18 to support same while in the use position. Hinge 22 pivotally connecting extension panel 18 to tailgate panel 20 is illustratively composed of a pin 34 extending through alternating knuckles 36 and 38 (see, also, FIG. 2) to allow pivoting between tailgate panel 20 and extension panel 18. For example, a portion of hinge 22 may be formed integral with or attached to an extension panel frame member 40 in the form of an extension frame knuckle 36, as shown. Adjacent the extension frame knuckle 36 is a tailgate frame knuckle 38 that forms another portion of hinge 22, which is also either integrally formed or attached to a frame member of tailgate panel 20. These alternating extension and tailgate frame knuckles 36 and 38, respectively, extend along the length of hinge 22 between tailgate panel 20 and extension panel 18 (see, e.g., FIG. 1). In the illustrative embodiment, hinge 22 extends to a hinge terminus 42 which, in this case, is a tailgate frame knuckle. This is so that hinge 22 does not interfere with the extending tabs 44 (or shoes) of the release portion of the latch/release mechanism 24. In this way, extension panel 18 may be pivoted to its stowed position underneath tailgate panel 20 (see FIGS. 2 and 3, for example), yet not interfere with normal access to those tabs 44 for releasing tailgate panel 20 from rails 4 and 6. It is appreciated that hinge 22 will terminate prior to interfering the opposing latch/release mechanism 24, as well to the extent it does not interfere with the normal operation of it. Other hinge varieties may be employed as well.

Figure 7:
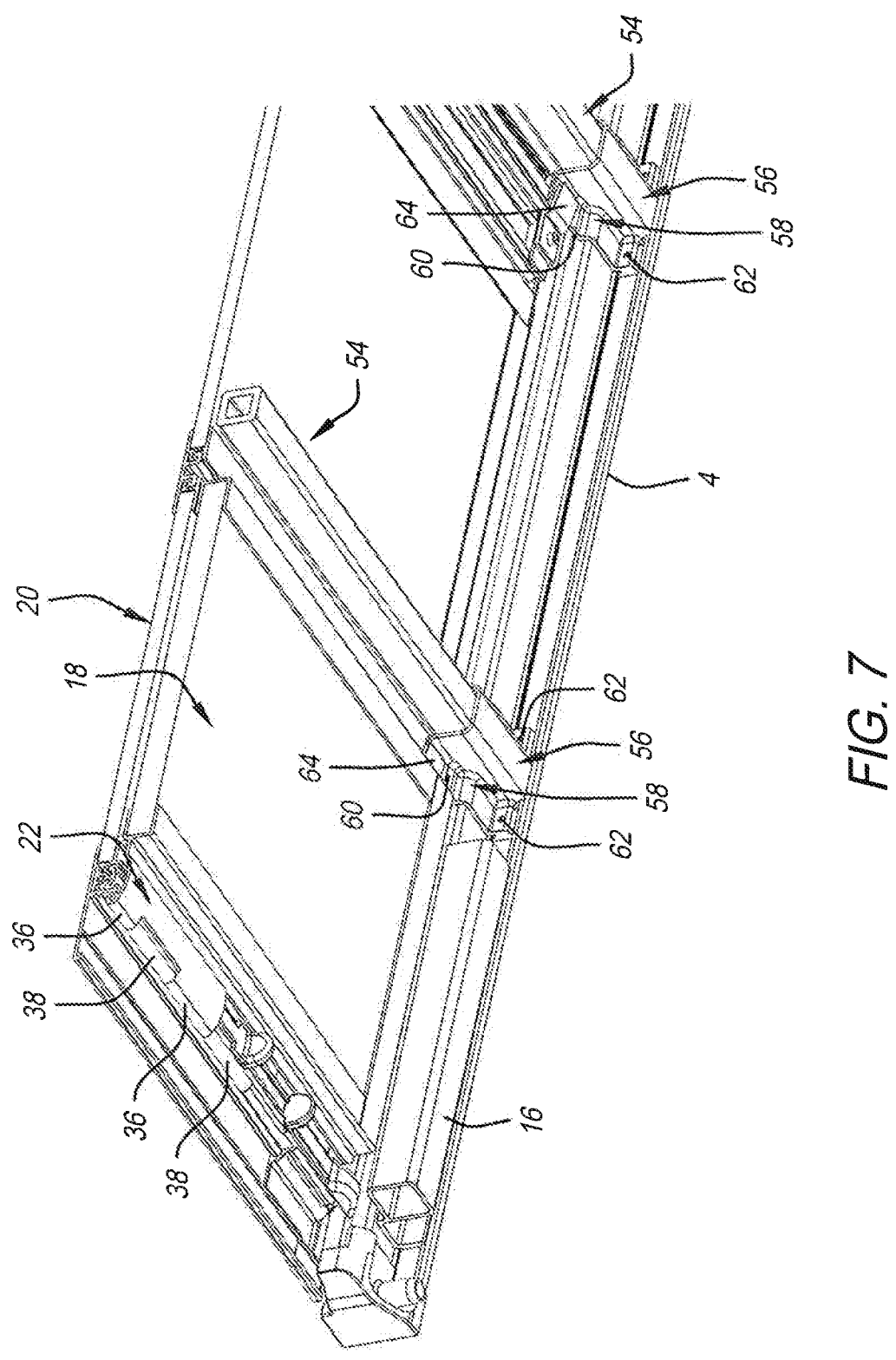
FIG. 7 is another detail underside perspective view of the portion of the tonneau cover.

Another detail perspective view of a portion of tonneau cover 2 is shown in FIG. 7. Here, extension panel 18 is folded underneath tailgate panel 20 to a stowed position via the pivoting of hinge 22. This view further depicts extension frame knuckles 36, as well as the alternating tailgate frame knuckles 38, to form hinge 22. Also shown in this view is the receiver 16 attached to rail 4.

Tonneau Cover Support Joists

Another illustrative embodiment of the present disclosure provides support joist assemblies 52 that include support joists 54 extended from opposing rails 4 and 6 underneath tonneau cover 2. Each support joist assembly 52 assists in supporting additional weight that may be applied to tonneau cover 2. For example, a mattress, seating, containers, tools, or other weighted objects may be set on top of tonneau cover 2. To provide needed support for that additional weight, joist hangers 56 may be attached to rail 4 or 6 to receive a support joist 54, such as a metal tube or beam, as shown in FIG. 7. Illustratively, joist hangers 56 may be positioned opposite each other on opposing rails 4 and 6. Support joist 54 may be fitted in the opposing joist hangers 56 and span the cargo box. Substantial weight applied to the top of tonneau cover 2, directed downward toward the cargo box, can be accounted for by support joist 54.

In a further illustrative embodiment, a tab 58 structure with one or more extending flanges 60 and a fastener 62 may attach to the rail. Tab 58 is used to engage a hook 64, attached to the underside of the panel, so that when tonneau cover 2 is laid flat, the panels cannot be lifted upwards. When tailgate panel 20 is unlatched and folded upward, hook 64 releases from tab 58, which allows the adjacent panel forward to be lifted as well, to uncover the cargo box. No additional latching and releasing mechanisms are necessary on additional panels to fold same and uncover the cargo box.

In this illustrative embodiment, tabs 58 may be integrally formed with or attached to joist hanger 56 to provide a securement means for each joist hanger 56 when attaching to either rail 4 or 6. It is appreciated that other attachment means independent of tab 58 may be employed in the alternative. For example, flanges may extend from the joist hanger that engage one or more channels in the rail to support the joist hanger. Fasteners or clamps may be employed in combination or alone to support the joist hanger on the rail. With respect to support joist 54, it may be lifted in and out of the top of the joist hanger 56 so it can be selectively used when additional weight will be carried by tonneau cover 2, but removed when full access to the cargo box underneath is desired.

It is appreciated that a plurality of support joist assemblies 52 may be attached to opposing rails underneath tonneau cover 2 as shown in FIG. 1. As demonstrated, spaced apart support joist assemblies 52, underneath tonneau cover 2, will distribute and support the load of additional weight placed on top of tonneau cover 2. In certain embodiments, the top of support joist 54 may be slightly spaced apart from the underside of tonneau cover 2. This is until sufficient weight is applied to tonneau cover 2 at which point support joist 54 will support that additional load along with tonneau cover 2 itself. Illustratively, one or more foam pads or other like dampening materials may be applied to the top surface of support joist 54 to prevent rattling between the underside of tonneau cover 2 and support joist assembly 52 while the vehicle is in motion.

The sectional views of tonneau cover 2, shown in FIGS. 3 and 4, further illustrate how support joist 54 is fitted in joist hangers 56, which are supported by rails 4 and 6. Support joist 54 fits into a pocket 66 in joist hanger 56. Pocket 66 has an open top which allows support joist 54 to be placed in joist hanger 56 from the top of same. Illustratively extending from each side of the joist hangers 56 are tab flanges 58 that fit in rail channel 68 of either or both rails 4 and 6. Fasteners 62 may be used to secure tab flanges 58 onto rail channel 68. It is appreciated that other securement means may be used to attach joist hanger 56 to the rails, such as welding mechanical fasteners securing to both the joist hanger and the rail, or other like attachment structures.

Figure 8:
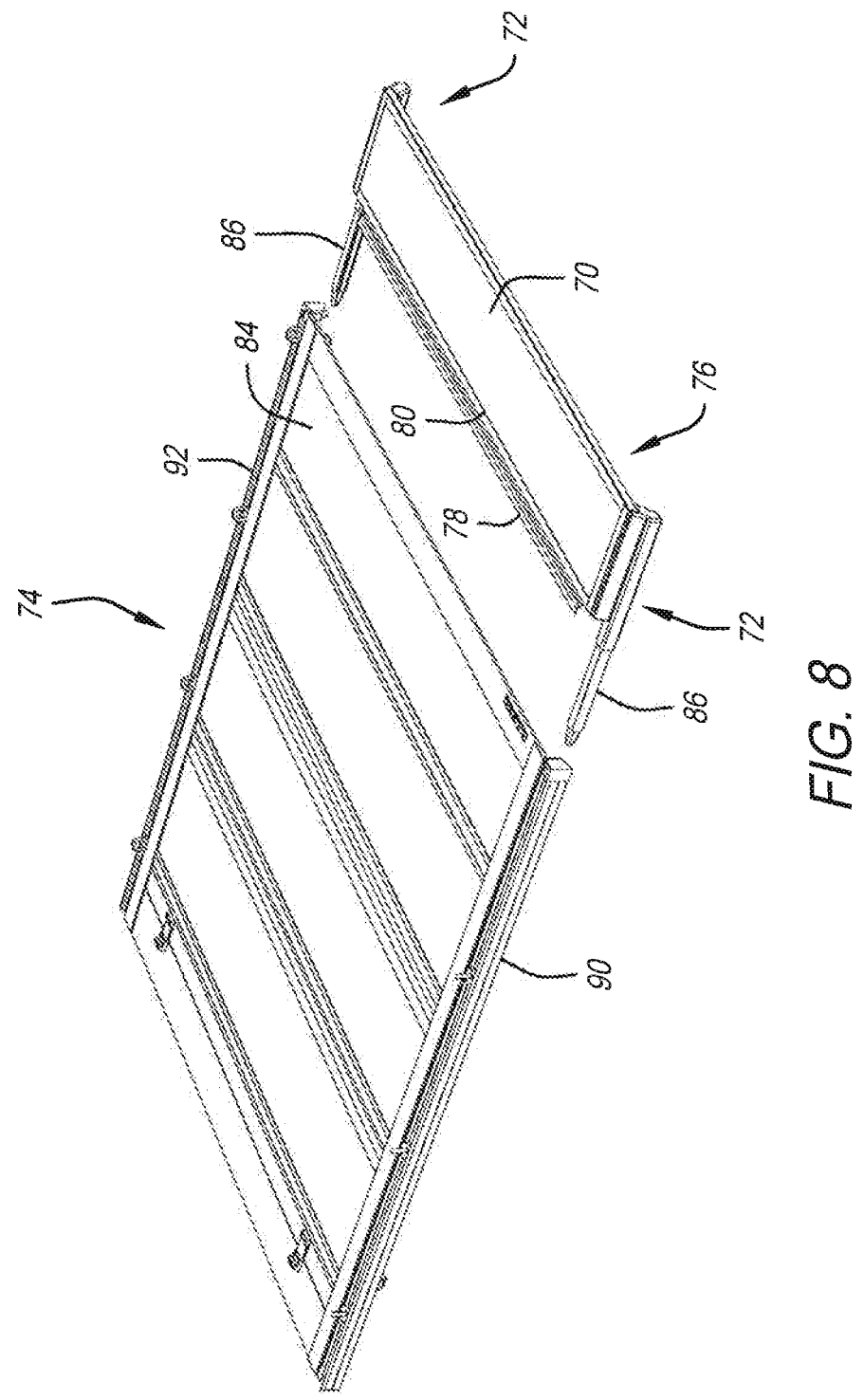
FIG. 8 is a perspective view of the tonneau cover.
Figure 9:
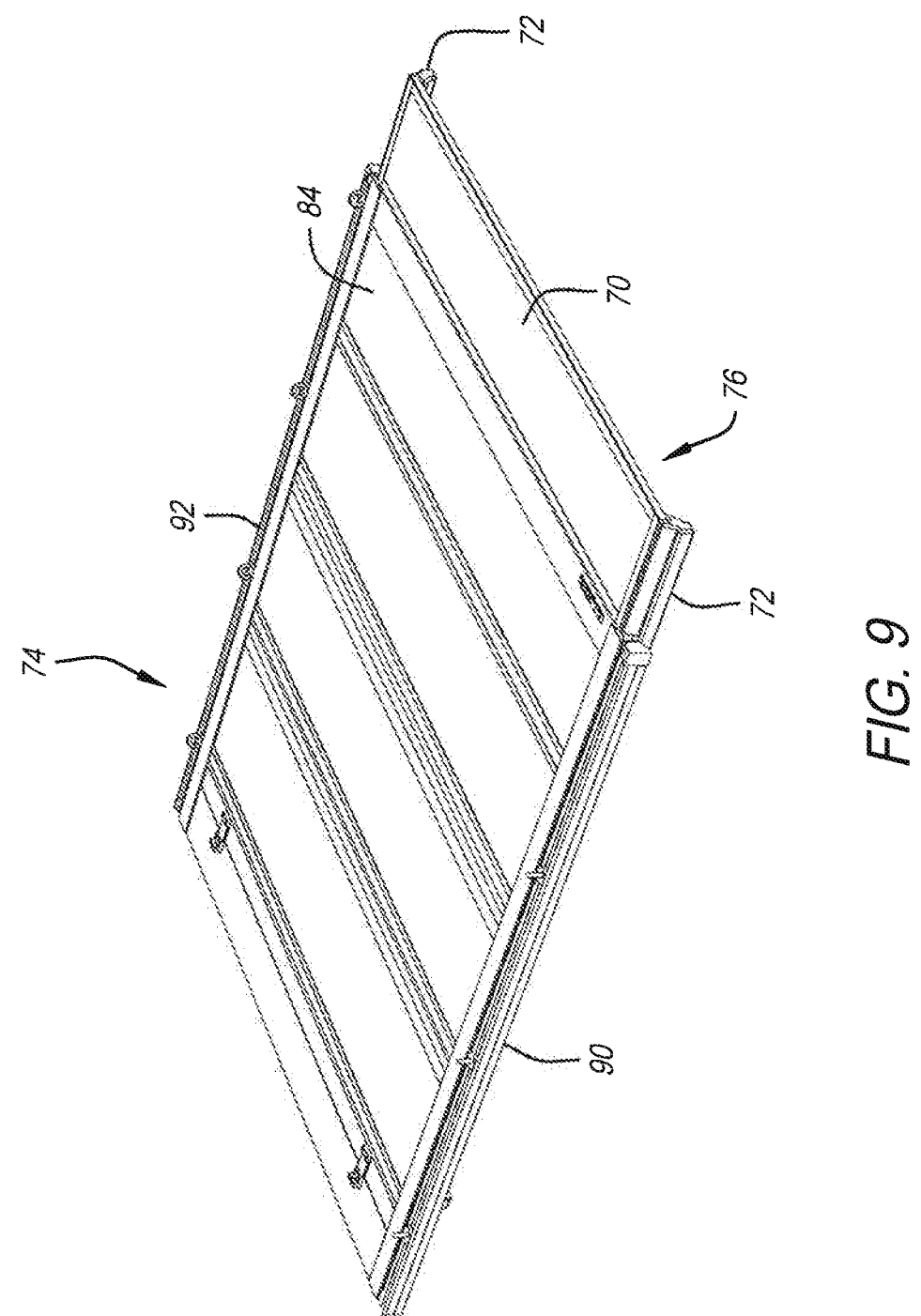
FIG. 9 is another perspective view of the tonneau cover.

Another illustrative embodiment of the present disclosure provides an extension panel 70 that extends the width (or length) of tonneau cover 2, but with support inserts 72 that are affixed to extension panel 70. Perspective views of a tonneau cover 74 are shown in FIGS. 8 and 9 that include an extension panel assembly 76 composed of the extension panel 70 and opposing support inserts 72 located on each side of same. The perspective view of tonneau cover 74, in FIG. 8, depicts extension panel assembly 76 spaced apart from tonneau cover 74. Here, it is appreciated that extension panel assembly 76 may be fully removed from tonneau cover 74. Extension panel assembly 76 may be stowed at a different location while tonneau cover 74 may otherwise operate as normal. An illustrative insert 78 may extend from a leading edge 80 of the extension panel. Insert 78 may be received in insert slot 82 in tailgate panel 84 (see FIG. 10) to align extension panel assembly 76 with respect to tonneau cover 74. This also mitigates a potential for a pinch point between the extension and tailgate panels.

The perspective view of tonneau cover 74, shown in FIG. 9, includes extension panel assembly 76 coupled to tonneau cover 74. It is appreciated from this view that tonneau cover 74 is now extended by virtue of extension panel assembly 76 to a longer length. When extension panel assembly 76 is no longer needed, it can be pulled from tonneau cover 74. Posts 86 (see FIG. 8) are removed from corresponding receivers 88 (see FIG. 10) on rails 90 and 92 similar to that described in the prior embodiments. Extension panel assembly 76, once removed, may be stowed separately from tonneau cover 74.

Figure 10:
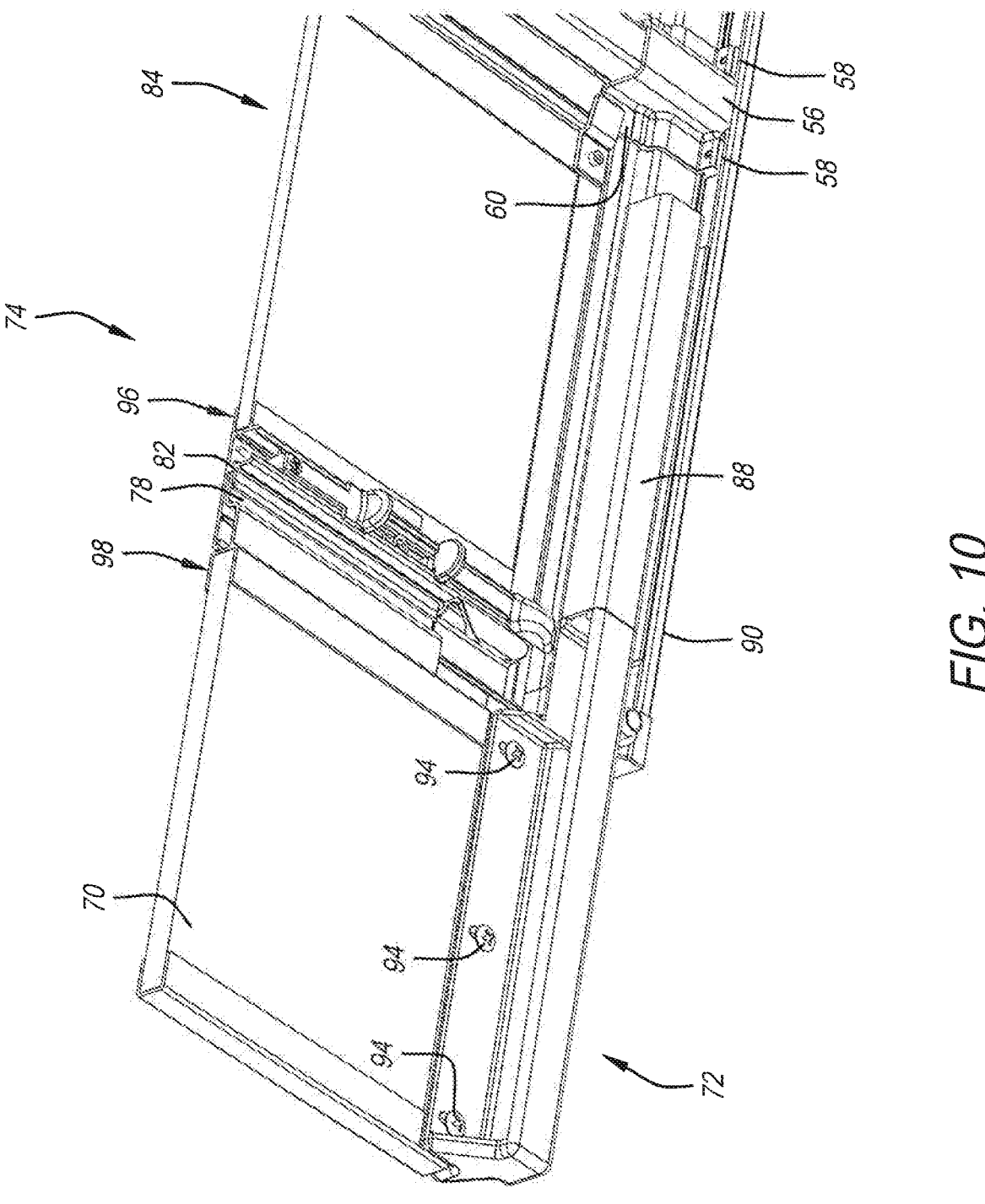
FIG. 10 is an underside detail perspective view of a rear portion of the tonneau cover.
Figure 11:
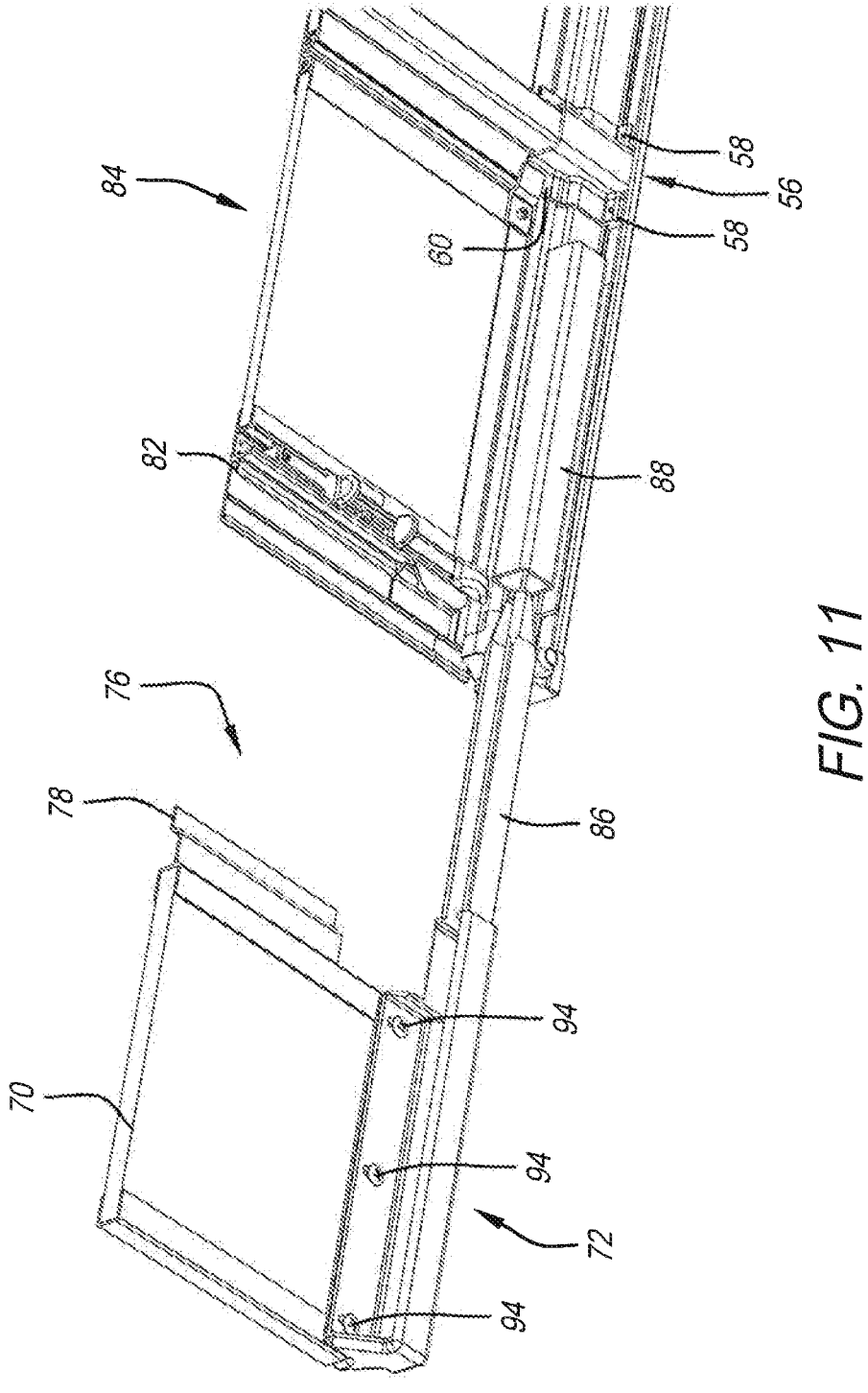
FIG. 11 is another underside detail perspective view of a rear portion of the tonneau cover.

Underside detail views of a rear portion of tonneau cover 74 are shown in FIGS. 10 and 11. The view in FIG. 10 depicts extension panel 70 fitted adjacent the tailgate panel 84 to extend tonneau cover 74. Post 86 of support insert 72 is fitted in receiver 88. This view demonstrates how support insert 72 may be secured to extension panel 70. As shown, fasteners 94 may illustratively be employed to secure support insert 72 to extension panel 70. Further, illustratively, insert slot 82 may be formed at the rear periphery of rear frame member 96 of tailgate panel 84. Insert 78 may be part of a front frame member 98 of extension panel 70 and configured to at least partially be fitted in insert slot 82 of tailgate panel 84. It is appreciated that the insert 78 and insert slot 82 may be part of the extrusion of their respective frame members.

The underside perspective detail view of tonneau cover 74, shown in FIG. 11, is similar to that shown in FIG. 10, except with extension panel assembly 76 removed from tailgate panel 84. As depicted, post 86 is removed from receiver 88 and insert 78 removed from insert slot 82. Support insert 72 is, however, still attached to extension panel 70 via fasteners 94. It is appreciated that, alternatively, support insert 72 may be attached to extension panel 70 by other means, such as welding an integrally formed extrusion to end caps, adhesives, etc. With the extension panel assembly 76 removed, tailgate panel 84 may be unlatched and operate conventionally.

Another illustrative embodiment of the present disclosure includes a removable extension panel assembly. In this embodiment, like the prior embodiment, the extension panel is removable from the tailgate panel. A telescoping receiver includes a support extension that extends from the rail to provide support to the extension panel. An insert on the extension panel, similar to the prior embodiment, selectively fits in an insert slot at the rear extrusion of the tailgate panel (see FIG. 14).

Figure 12:
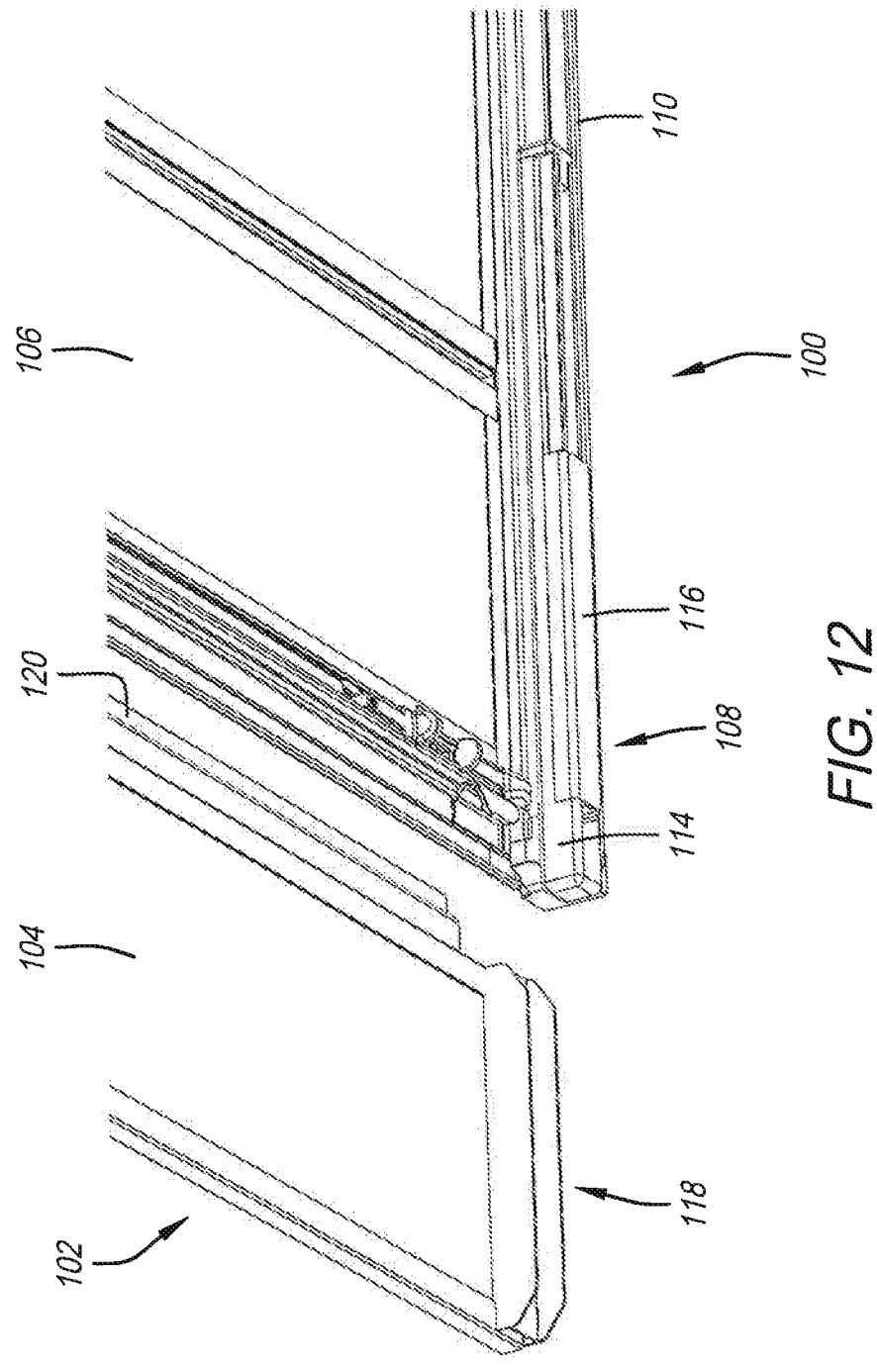
FIG. 12 is an underside detail perspective view of a rear portion of the tonneau cover.
Figure 13:
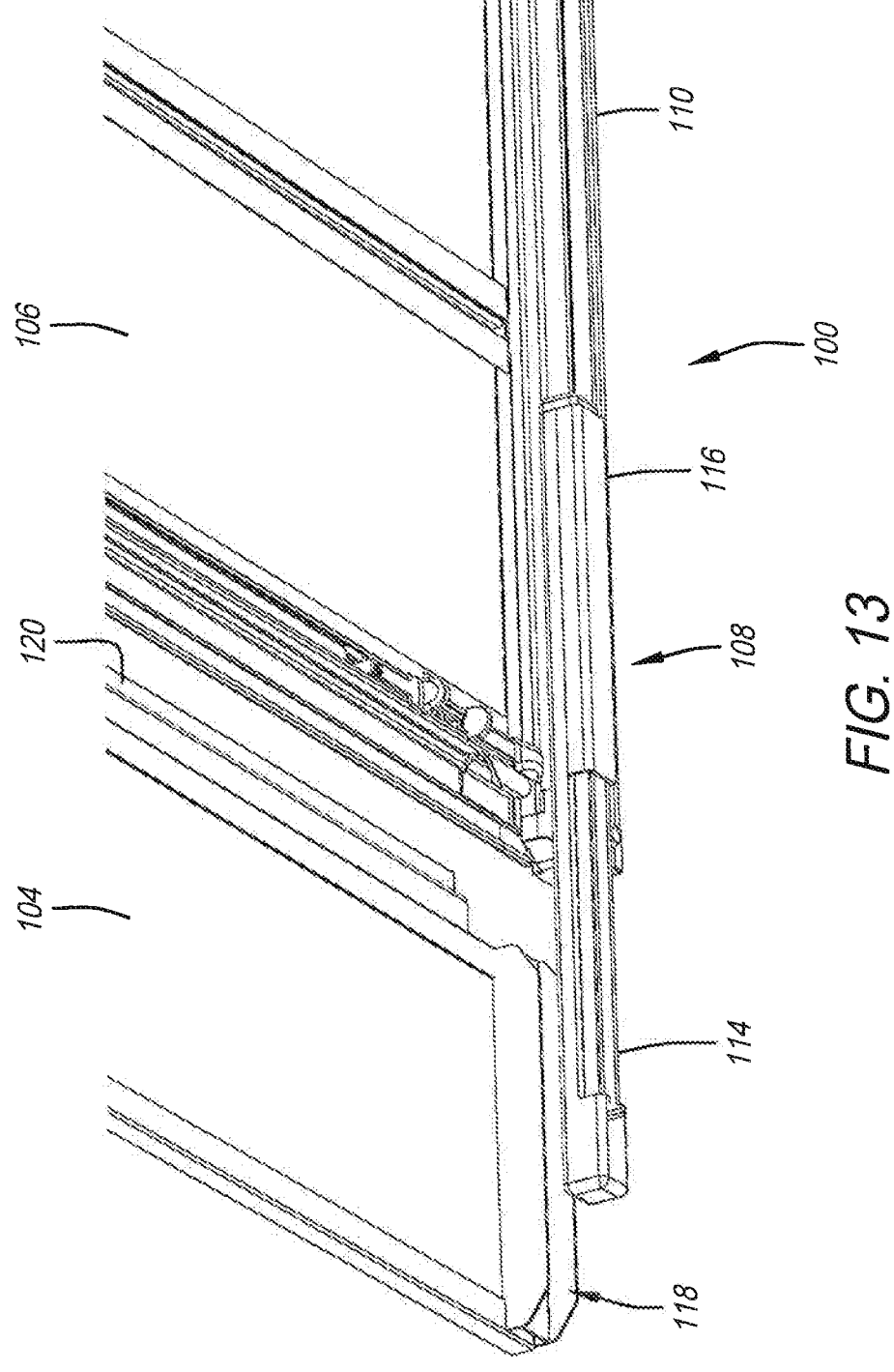
FIG. 13 is another underside detail perspective view of a rear portion of the tonneau cover.
Figure 14:
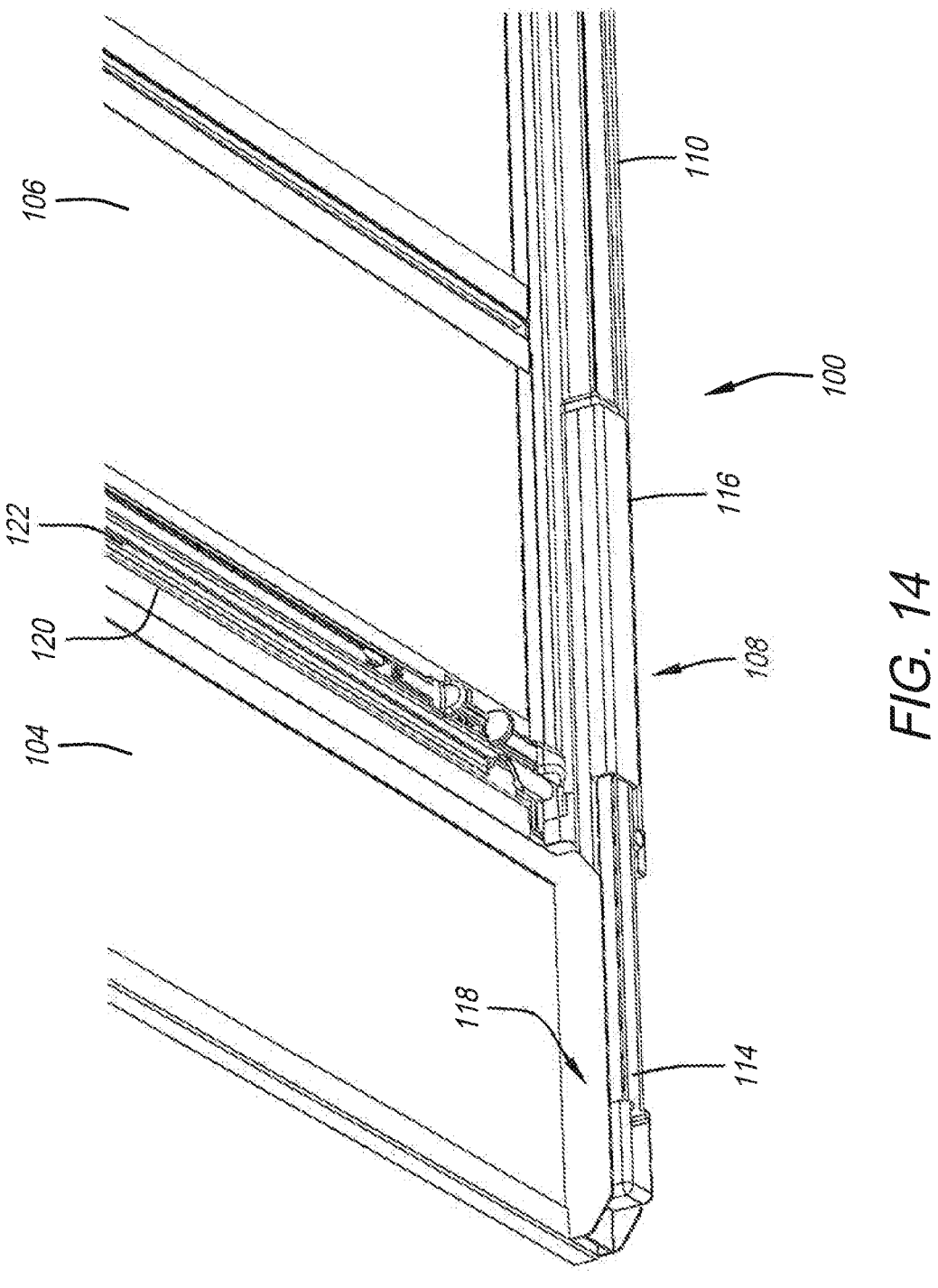
FIG. 14 is an underside detail perspective view of a rear portion of the tonneau cover.

Underside detail perspective views of a rear portion of a tonneau cover 100 are shown in FIGS. 12, 13, and 14. These views depict the structures of a removable extension panel assembly 102 in operation. The underside detail perspective view of tonneau cover 100, shown in FIG. 12, includes extension panel 104 separated from tailgate panel 106. A telescoping receiver 108 is shown attached to rail 110 with a support extension 114 recessed back on a receiver base 116. Tonneau cover 100, including tailgate panel 106, may operate as normal with respect to latching and unlatching tonneau cover 100. A support channel 118 is shown located underneath extension panel 104. Support channel 118 is configured to receive a portion of support extension 114 to carry the load applied to extension panel 104 when used with tonneau cover 100.

The underside perspective detail view of the rear portion of tonneau cover 100 is shown in FIG. 13. Here, extension panel 104 is still separated from tailgate panel 106. Support extension 114 is moved outward with respect to receiver base 116 and in position to be received by support channel 118 of extension panel 104. It is appreciated from this view that extension panel 104 may be selectively used to extend the length of tonneau cover 100 or may be removed therefrom so tonneau cover 100 may be conventionally operated without interference from extension panel 104. It is further appreciated that extension panel 104, when separated from tonneau cover 100, may be stowed separately therefrom. Support extension 114 may likewise be pushed back towards rail 110 and into receiver base 116 to be kept out of the way of normal operation of tonneau cover 100 until it is desired for extension panel 104 to be used again.

The underside perspective detail view of tonneau cover 100, shown in FIG. 14, includes extension panel 104 carried by support extension 114 fitted into support channel 118. An insert 120, from extension panel 104, is fitted into insert slot 122 of tailgate panel (see, also, e.g. FIG. 10). It is appreciated, however, that receiver 108, being attached to rail 110, assists in carrying the load applied to extension panel 104 and weight that it carries, which transfers through support extension 114. It is further appreciated that extension panel 104 may be removed from support extension 114, which can be moved into receiver base 116 on the rail when extension panel 104 is not needed. This view further depicts how extension panel 104 extends the width of tonneau cover 100 from tailgate panel 106. Again, extension panel 104, from front to rear, may be of any desired length to extend tonneau cover 100 to support the surface as needed.

Sliding Tonneau Cover

Another illustrative embodiment of the present disclosure is directed to a sliding tonneau cover. Telescoping rail assemblies may be used to slide the tonneau cover either toward the cab end or the tailgate end of the cargo box. When the tonneau cover is pulled away from the cab end of the cargo box, a filler panel may be placed over the opening in order to extend the length of the useable top surface of the tonneau cover. The extra length created by the tonneau cover and filler panel may be sufficient to provide a support surface for a mattress or other loads that require a support surface longer than traditional tonneau cover lengths. A latch assembly on the bulkhead panel may selectively fit into forward or rear latch pockets on the outer rail to selectively hold the tonneau cover in its forward use position or its extended support position.

Figure 15:
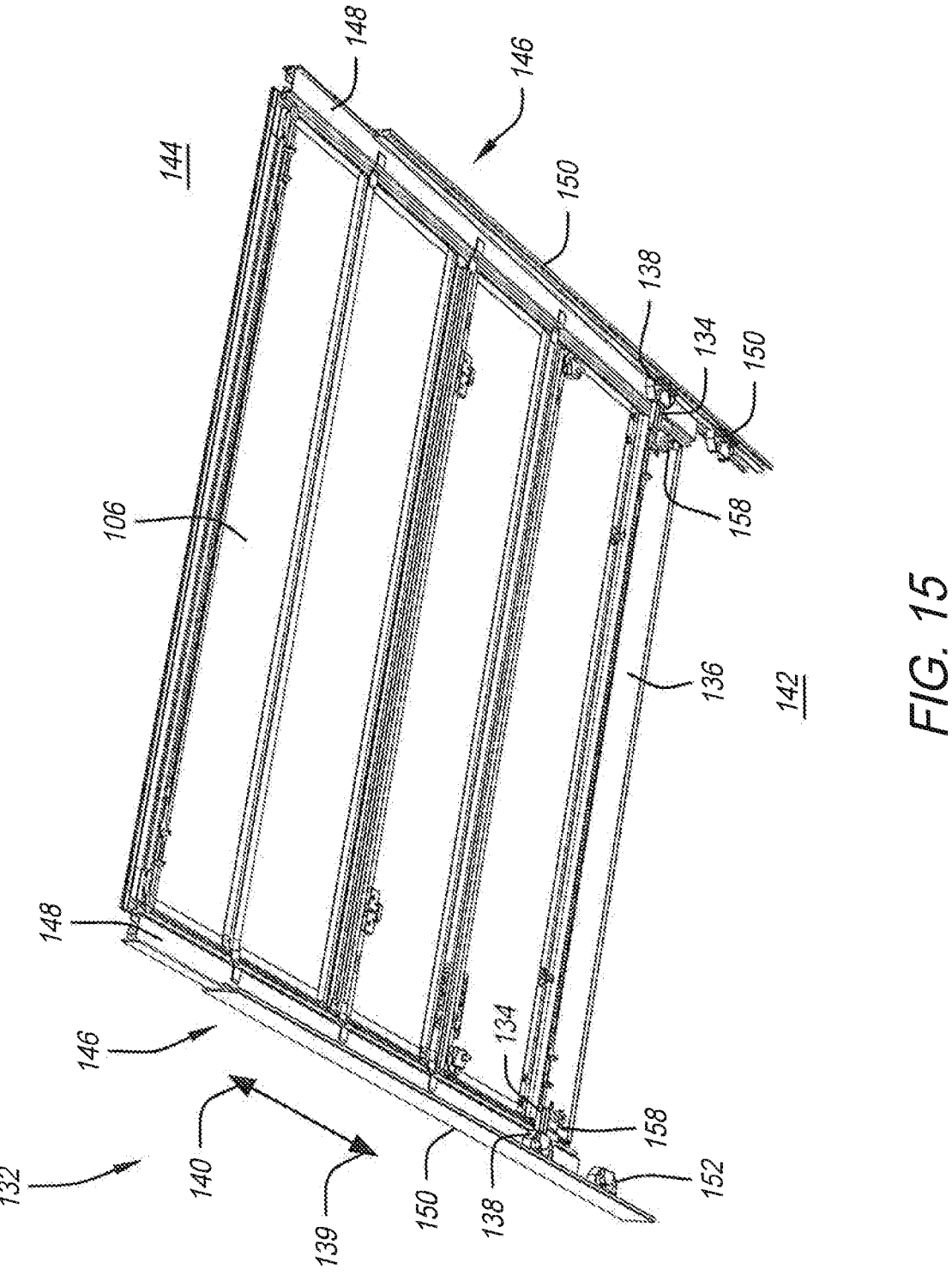
FIG. 15 is an underside perspective view of the tonneau cover.
Figure 16:
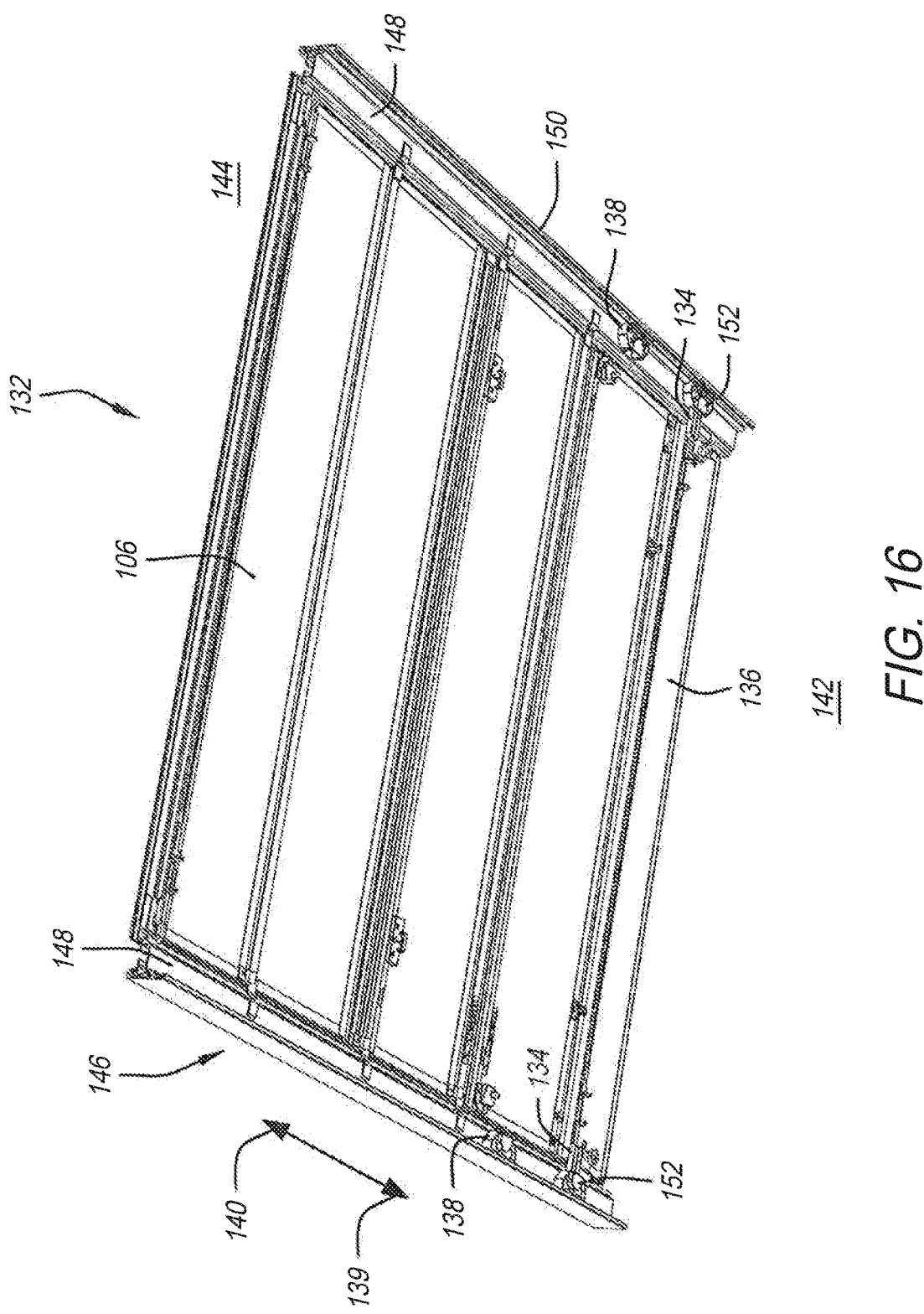
FIG. 16 is another underside perspective view of the tonneau cover.

An underside perspective view of tonneau cover 132, shown in FIG. 16, depicts it moved forward from its extended support position, as shown in FIG. 15, to its conventional use position. To accomplish this, latches 134 on bulkhead panel 136 are removed from rear latch pockets 138, as shown in FIG. 15. Tonneau cover 132 may then be moved forward in direction 139 toward cab end 142 and via inner rails 148 of the telescoping rail assembly 146 with respect to outer rails 150. Latches 134 may then fit into their respective forward latch pockets 152, which secure tonneau cover 132 with respect to outer rail 150. It is appreciated that outer rail 150 of telescoping rail assembly 146 is secured to the sidewall of the cargo box. Rear and forward latch pockets 138 and 153, respectively, are attached to outer rail 150 to establish positive placement of tonneau cover 132 with respect to the cargo box. Because inner rails 148 slide in directions 139 and 140 with respect to outer rails 150, tonneau cover 132 is movable, as a whole, to different positions with respect to outer rails 150 and, thus, the cargo box. Hence, positioning and latching tonneau cover 132 in different positions with respect to the cargo box allows tonneau cover 132 to be used as either a conventional tonneau cover or as an extended support surface with the further aid of a filler panel 154. It is appreciated that other uses may be employed by tonneau cover 132 when in its unfolded covering position, and may be selectively movable via being clamped to a first rail that is movable with respect to a second rail.

Underside detail perspective views of a front portion of tonneau cover assembly 132 is shown in FIGS. 17, 18, 19, and 20. These views depict how a latch head 156 of latch 134 is moved to secure or release from the latch pockets, which allows tonneau cover 132 to move to different positions based on the location of those latch pockets. Additionally, the latch pockets may include a limiter that prevents over-travel of the tonneau cover either forward or backward. This may illustratively restrict the extent to which the tonneau cover may travel to predetermined lengths.

Figure 17:
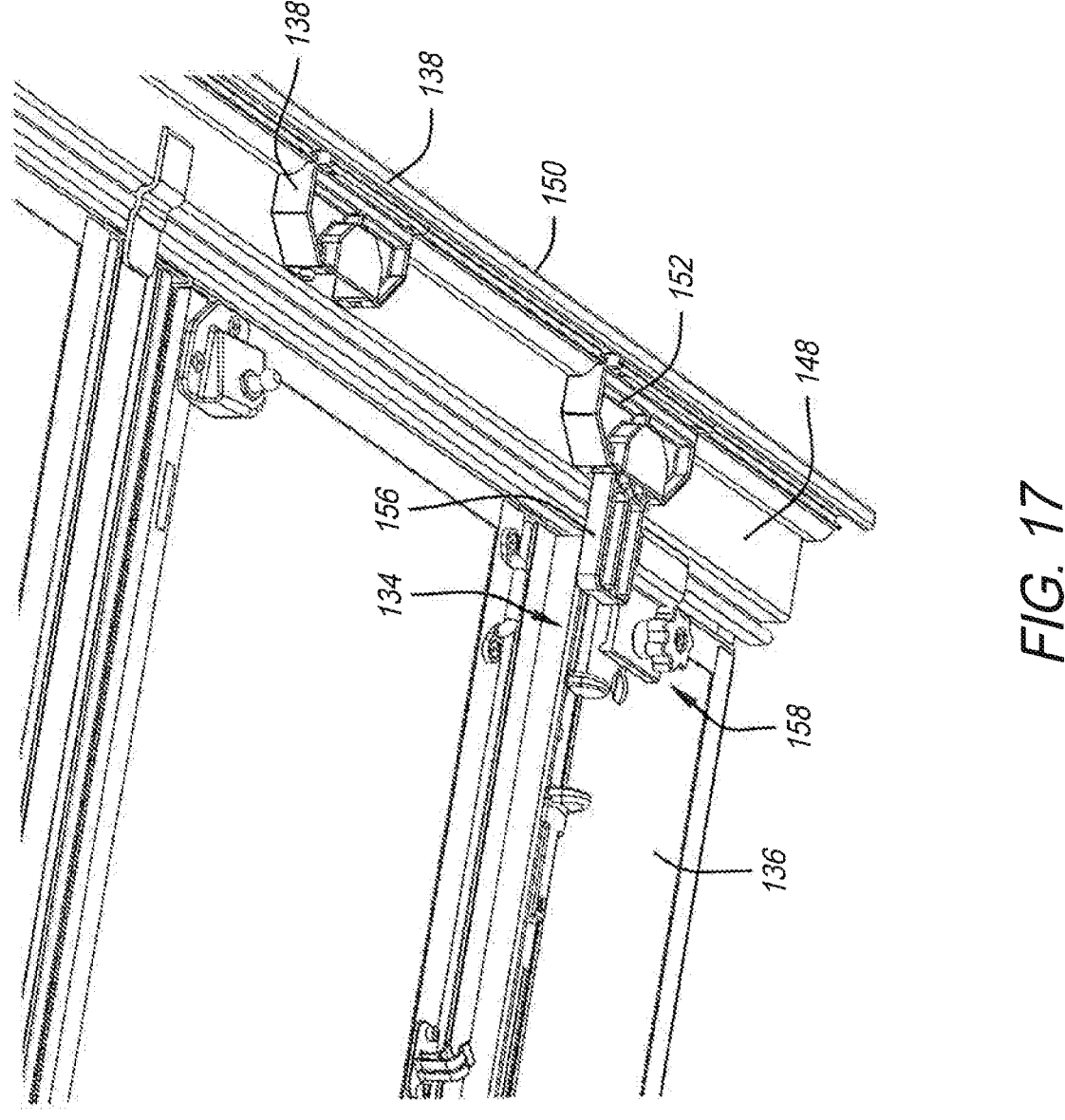
FIG. 17 is an underside detail perspective view of a front portion of the tonneau cover.

The underside detail perspective view of tonneau cover 132, shown in FIG. 17, depicts a latch head 156, which is part of latch 134 on bulkhead panel 136, to be fitted in a forward latch pocket 152, which is secured to outer rail 150. In this configuration, tonneau cover 132 is positioned adjacent cab end 142 of the cargo box (see FIG. 15) so tonneau cover 132 may operate conventionally. No space is created for filler panel 154 (see FIGS. 23 and 24) to extend the support surface of tonneau cover 132. It is appreciated that in other embodiments, however, forward and rear latch pockets 152 and 138, respectively, may be located at various locations along telescoping rail assembly 146 to, likewise, create various opening configurations with respect to the cargo box.

Figure 18:
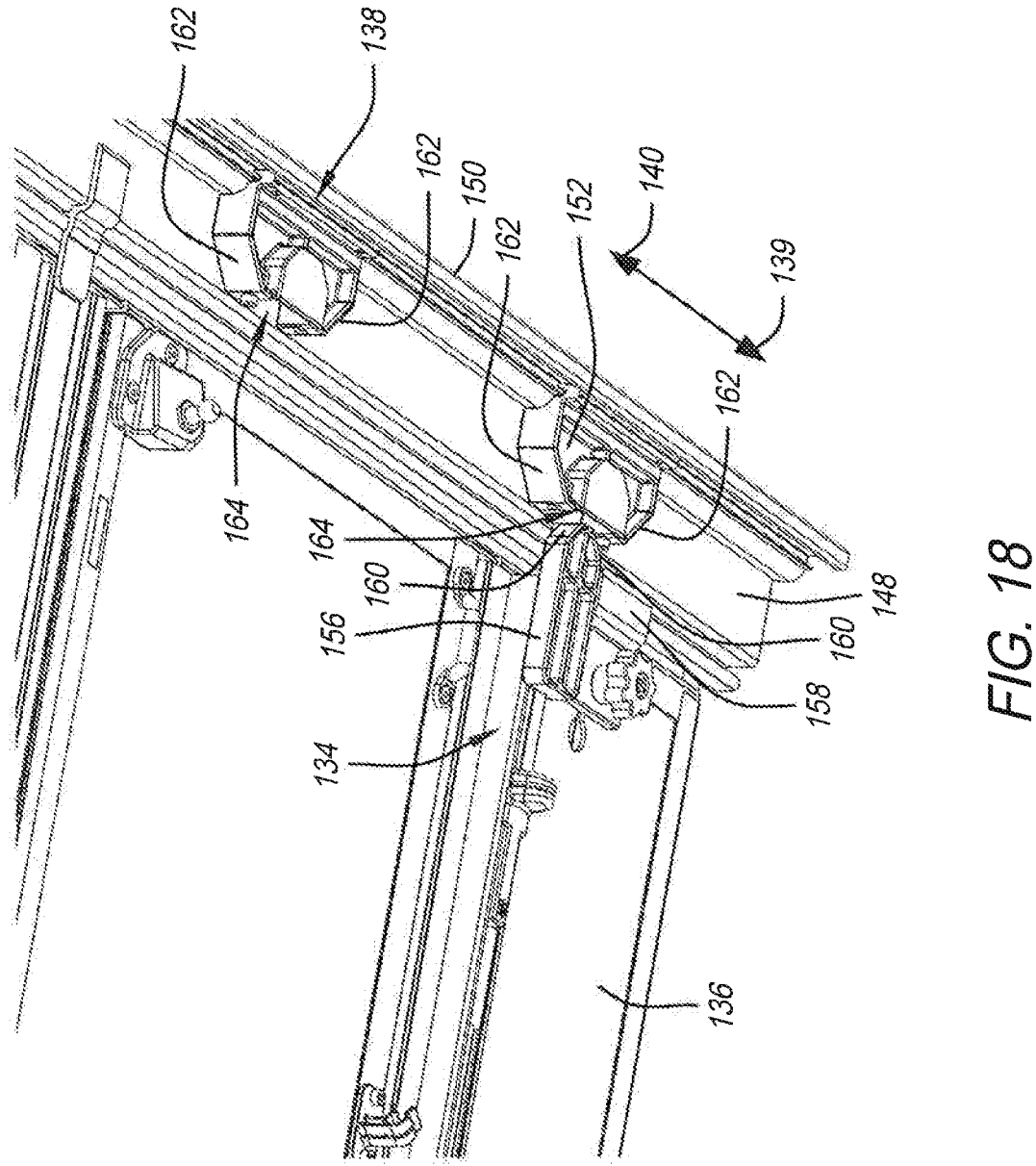
FIG. 18 is another underside detail perspective view of a front portion of the tonneau cover.

The underside detail perspective view of tonneau cover 132, shown in FIG. 18, is similar to that of FIG. 17, with the exception of latch head 156 associated with latch 134 on bulkhead panel 136 being removed from forward latch pocket 152 allowing tonneau cover 132 to move with respect to outer rail 150. It is appreciated that bulkhead panel 136 is clamped and, thus, attached to inner rail 148 via clamp 158, as shown. This means tonneau cover 132, as a whole, is movable with inner rail 148 as it moves. With latch head 156 removed from forward latch pocket 152, tonneau cover 132 is free to move with inner rail 148 as indicated by directional arrows 139 and 140. In the illustrative embodiment, latch heads 156 may include one or more angled surfaces 160 configured to engage a corresponding angled surface 162 on a latch pocket, either 152 and/or 138, in this case rear latch pocket 138. Because latch head 156 is biased via a spring towards the latch pockets, when sliding tonneau cover 132 along outer rail 150, as indicated by directional arrows 139 and 140, if latch head 156 engages one of latch pockets 138 or 152, the corresponding angled surfaces 162 create lateral movement of latch head 156 against the force of bias so it can move along the latch pocket until latch head 156 reaches opening 164 of the latch pocket. At this point, the bias exerted on latch head 156 will push same into opening 164 and, thus, into the latch pocket.

Figure 19:
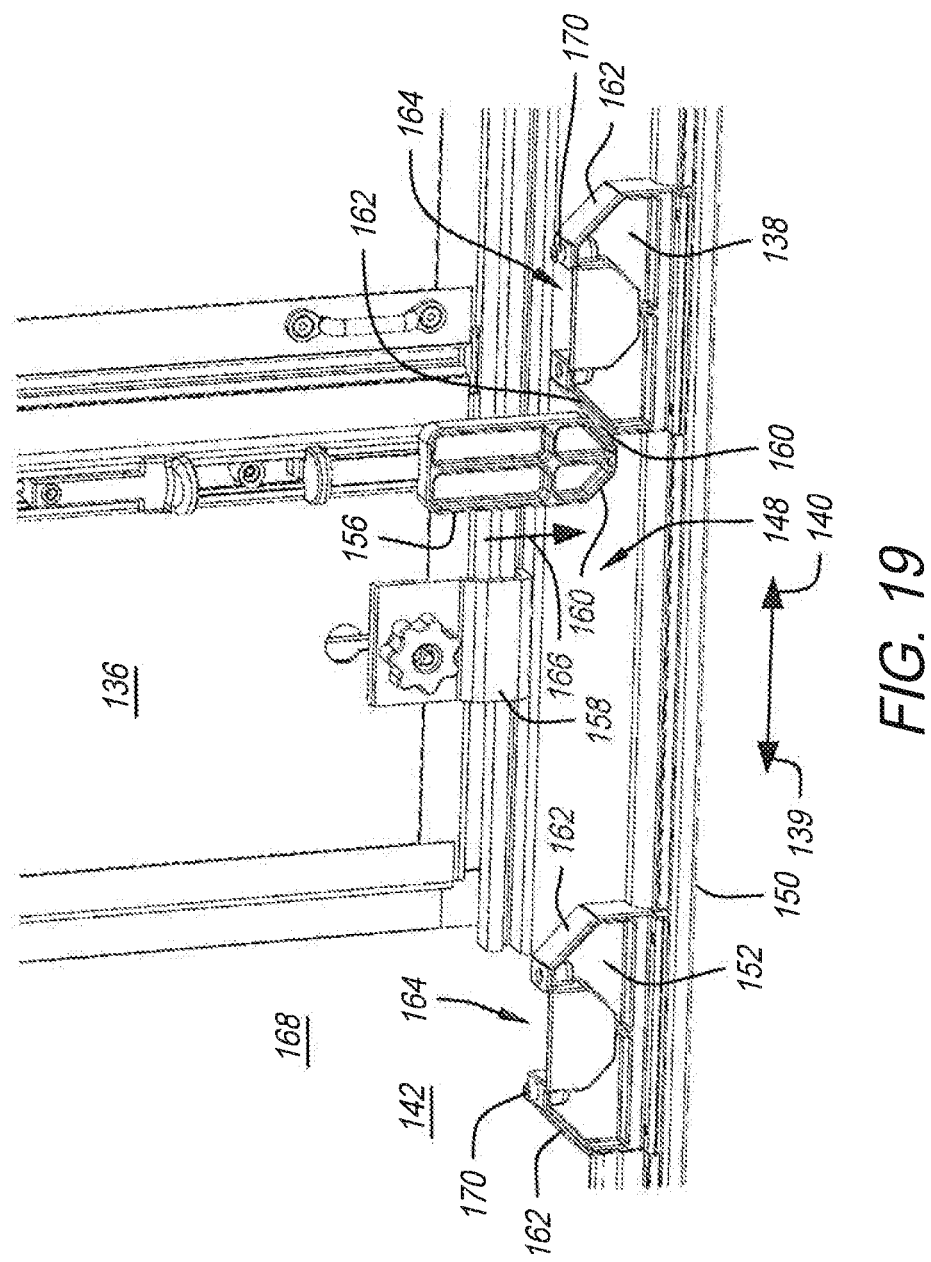
FIG. 19 is another underside detail perspective view of a front portion of the tonneau cover.

As shown in FIG. 19, moving tonneau cover 132 further towards rear latch pocket 138 in direction 140, the same will cause latch head 156 to move against its spring bias direction 166 until moving tonneau cover 132 further so latch head 156 is over opening 164. At this point, spring bias 166, on latch head 156, will push same into rear latch pocket 138. It is appreciated that this occurs on both sides of tonneau cover 132 and is the same action for both forward and rear latch pockets 152 and 138, respectively. In this case tonneau cover 132 is creating space 168 between it and cab end 142 of the cargo box, which can be occupied by filler panel 154 if desired to extend the support surface of tonneau cover 132.

In addition to the travel distance of tonneau cover 132 defined by the separation between forward and rear latch pockets 152 and 138, it may be desirable to include travel limiters 170 to ensure tonneau cover 132 does not travel beyond either the forward or rear latch pockets 152 and 138. By including travel limiters 170, tonneau cover 132 may be prevented from being pushed too far forward adjacent the cab at cab end 142 of the cargo box or rearward towards tailgate end 144 and out from the cargo box. Travel limiter 170 prevents over-travel either forward or backwards of tonneau cover 132.

Figure 20:
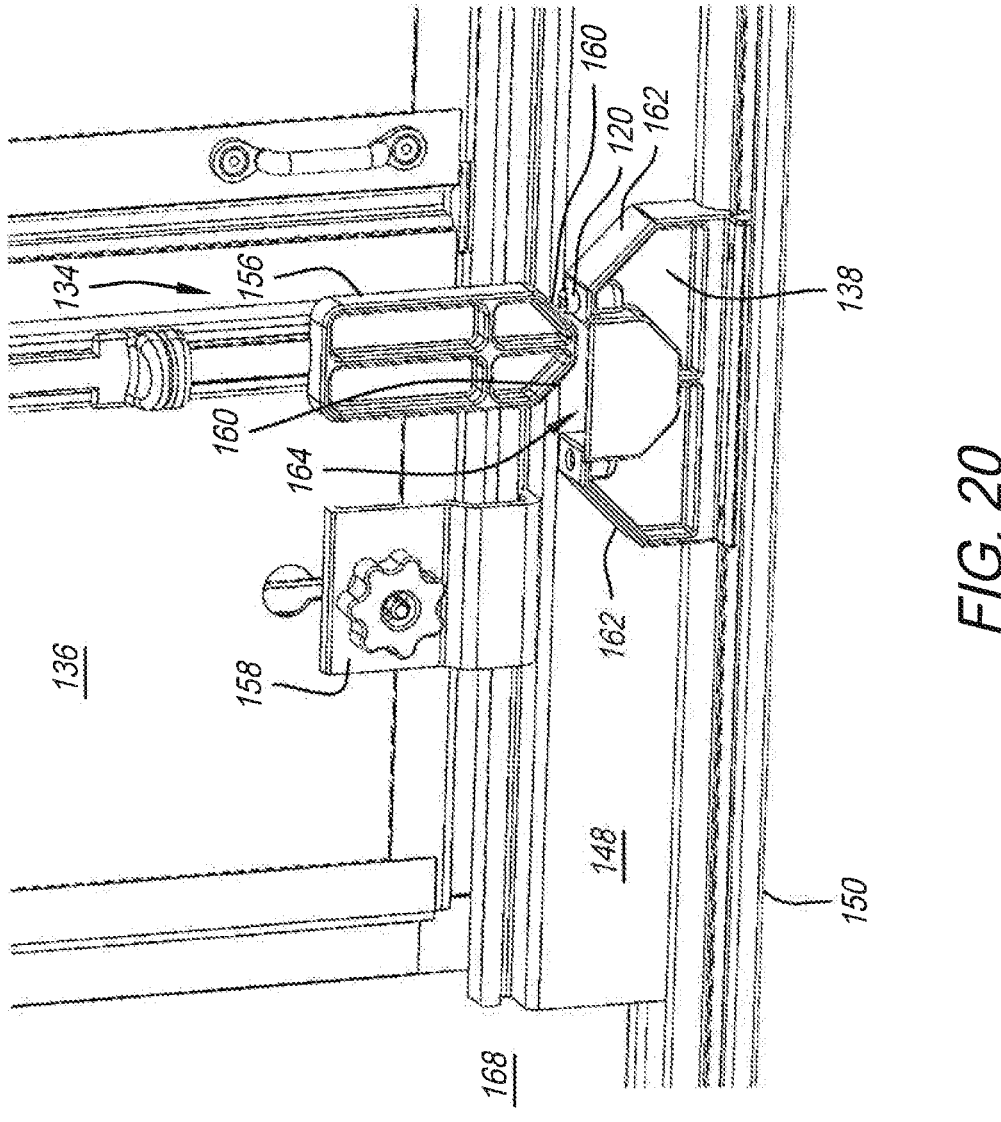
FIG. 20 is another underside detail perspective view of a front portion of the tonneau cover.

As shown in the underside detail perspective view of tonneau cover 132, in FIG. 20, a travel limiter 170, such as an illustrative bolt head, may be affixed to rear latch pocket 138. Travel limiter 170 does not have a corresponding surface like angled surface 162 of the latch pockets so latch head 156 cannot move past it. Additionally, the length of travel latch head 156 has against the force of bias 166 by the spring (not shown) acting on latch head 156 may be such that latch head 156 will clear rear latch pocket 138, but not the travel limiter 170 as shown in FIG. 20. It is appreciated that both rear latch pocket 138 and forward latch pocket 152 may include such travel limiters 170, as shown in FIG. 19. As a consequence, the maximum length of travel tonneau cover 132 will have is between travel limiters 170 on the forward and rear latch pockets 152 and 138.

Figures 21, 22:
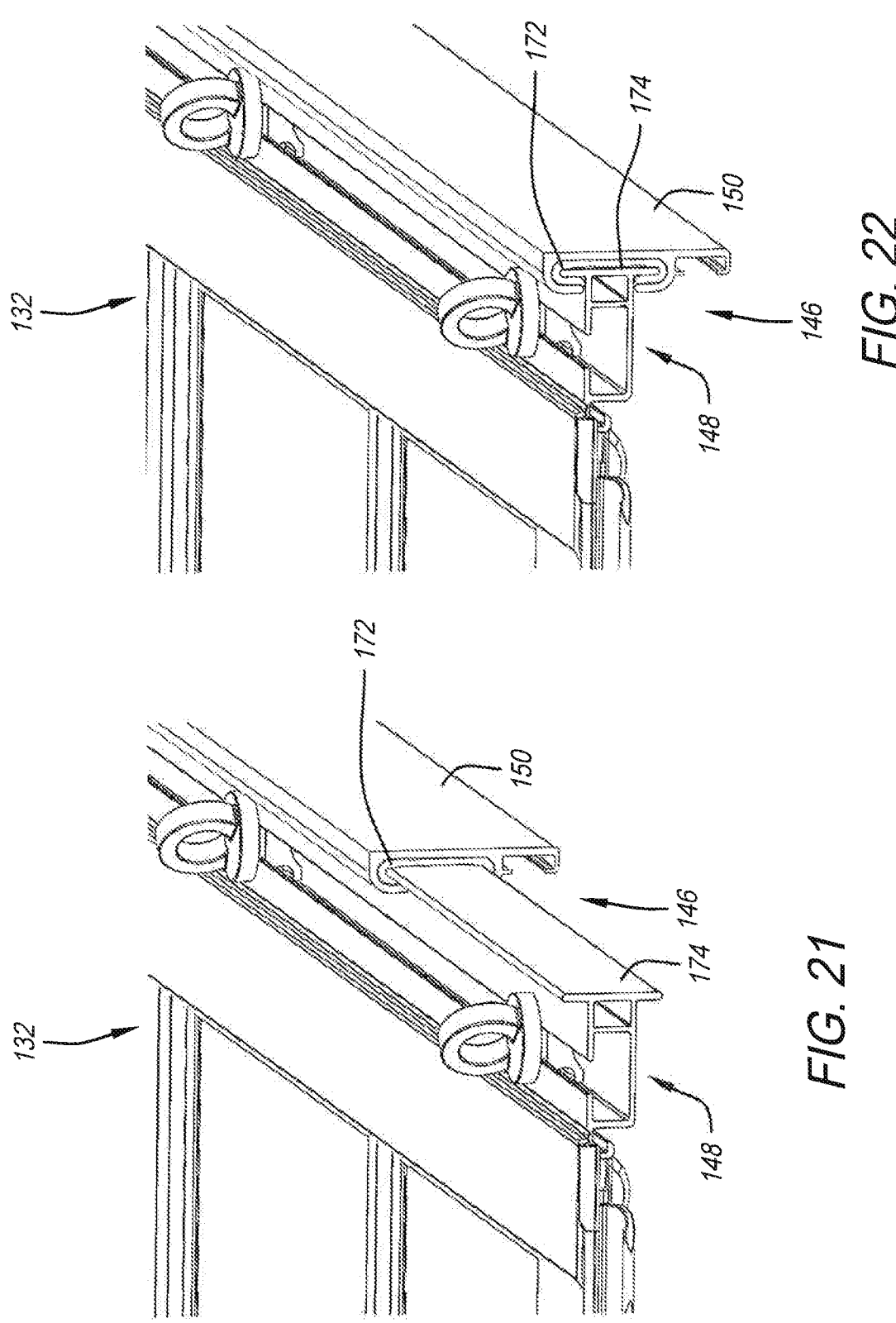
FIG. 21 is a perspective detail view of a portion of a tonneau cover with a telescoping rail assembly.
FIG. 22 is another perspective detail view of a portion of a tonneau cover with a telescoping rail assembly.

Perspective detail views of a portion of the tonneau cover and telescoping rail assembly 146 are shown in FIGS. 21 and 22. The view in FIG. 21 depicts inner rail 148 of telescoping rail assembly 146 extending out from outer rail 150. A bearing surface member 172 may be positioned between inner rail 148 and outer rail 150 as illustratively shown to allow smooth travel between the two rails. The view of FIG. 22 includes inner rail 148 pushed inward towards outer rail 150 along the bearing surface member 172. Illustratively, in both views, a slide plate portion 174 of the inner rail 148 is located adjacent the bearing surface member.

Figure 23:
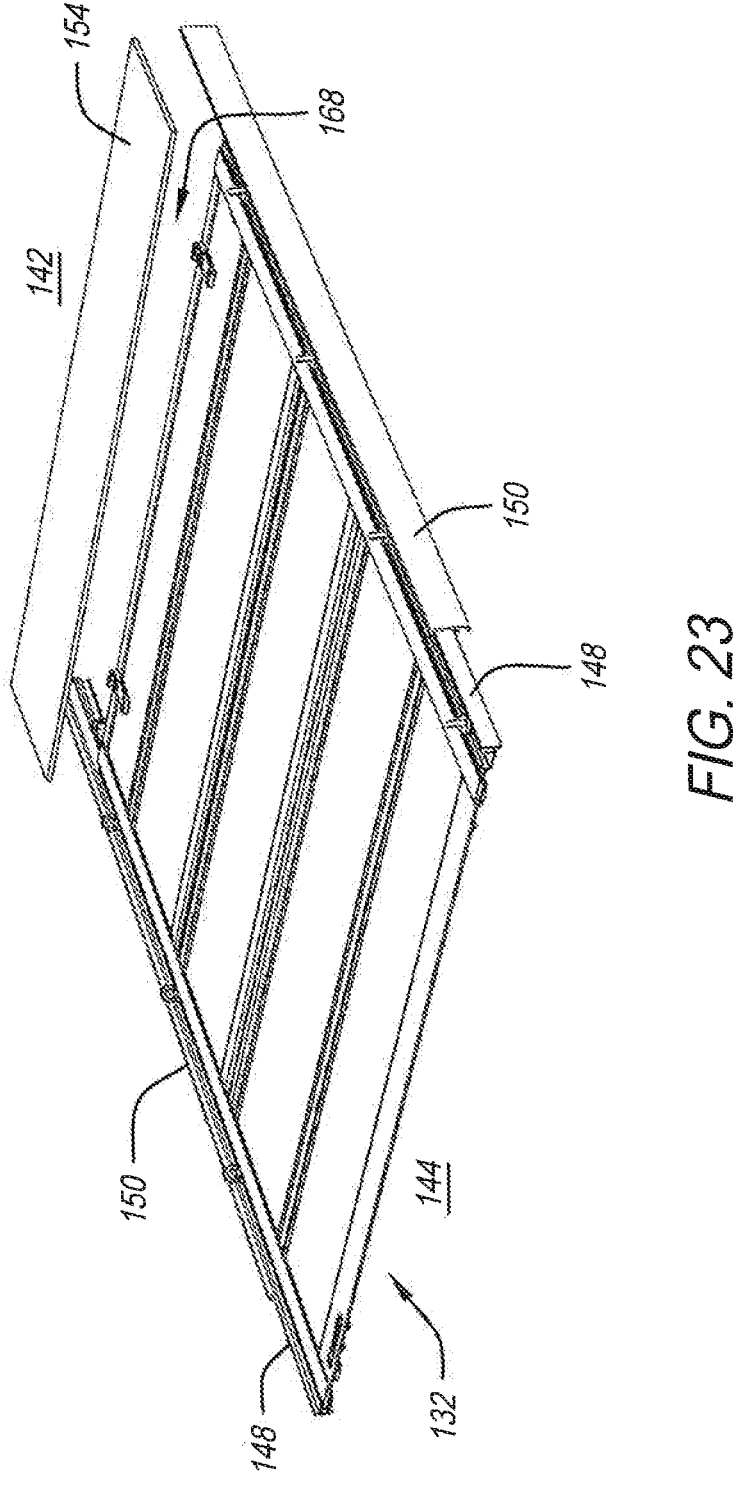
FIG. 23 is a perspective view of the tonneau cover, telescoping rails, and a filler panel.
Figure 24:
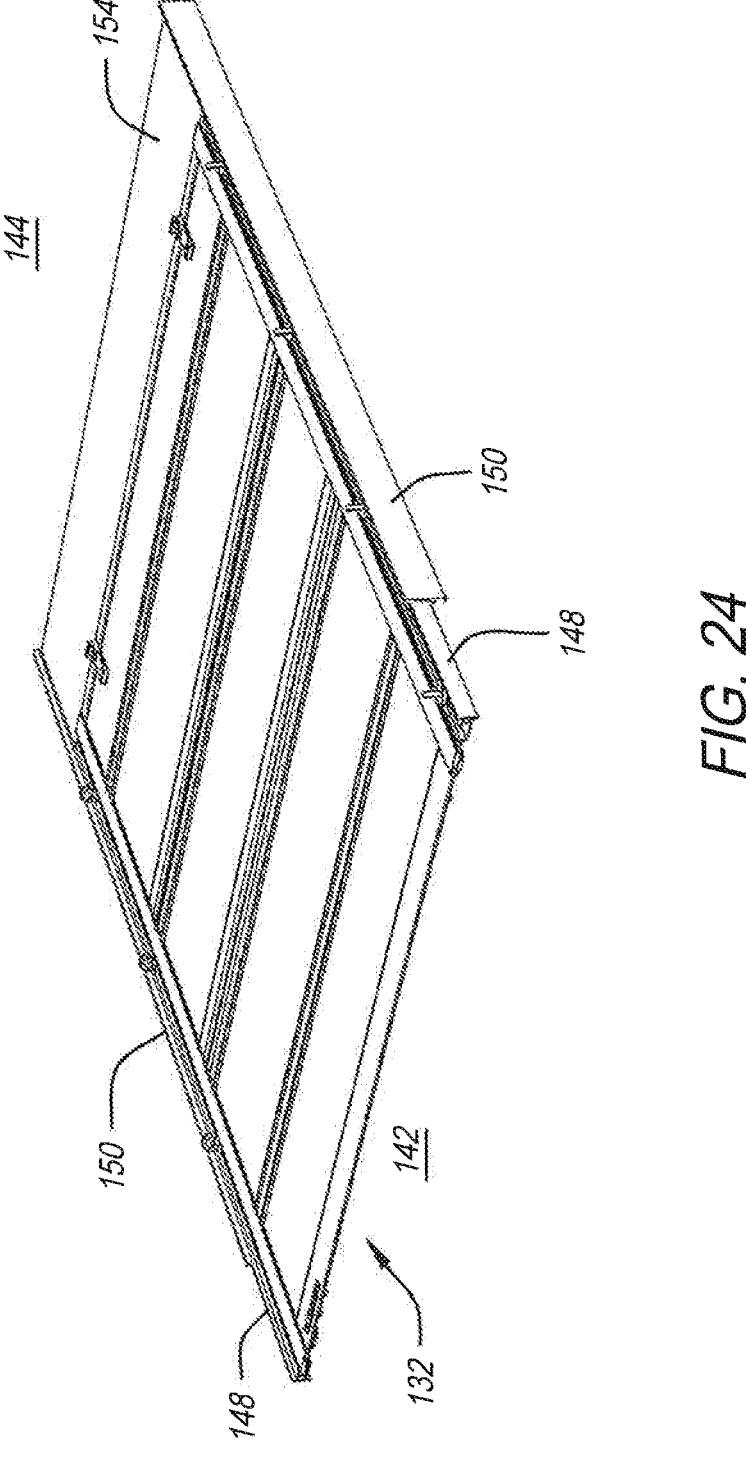
FIG. 24 is another perspective view of the tonneau cover, telescoping rails, and a filler panel.

Perspective views of tonneau cover 132 are shown in FIGS. 23 and 24. In both views, inner rail 148 is extended from outer rail 150 toward tailgate end 144 to create a space 168 toward cab end 142. Filler panel 154 may be placed on outer rail 150 to extend the top surface of tonneau cover 132. This allows additional length of tonneau cover 132 to support any desired load. As shown in FIG. 23, filler panel 154 has not yet been placed onto outer rail 150. In contrast, and as shown in FIG. 24, filler panel 154 is placed on rail outer 150. This extends the usable top surface of tonneau cover 132 to also include the top surface of filler panel 154.

Tonneau Cover Clamp

Figure 25:
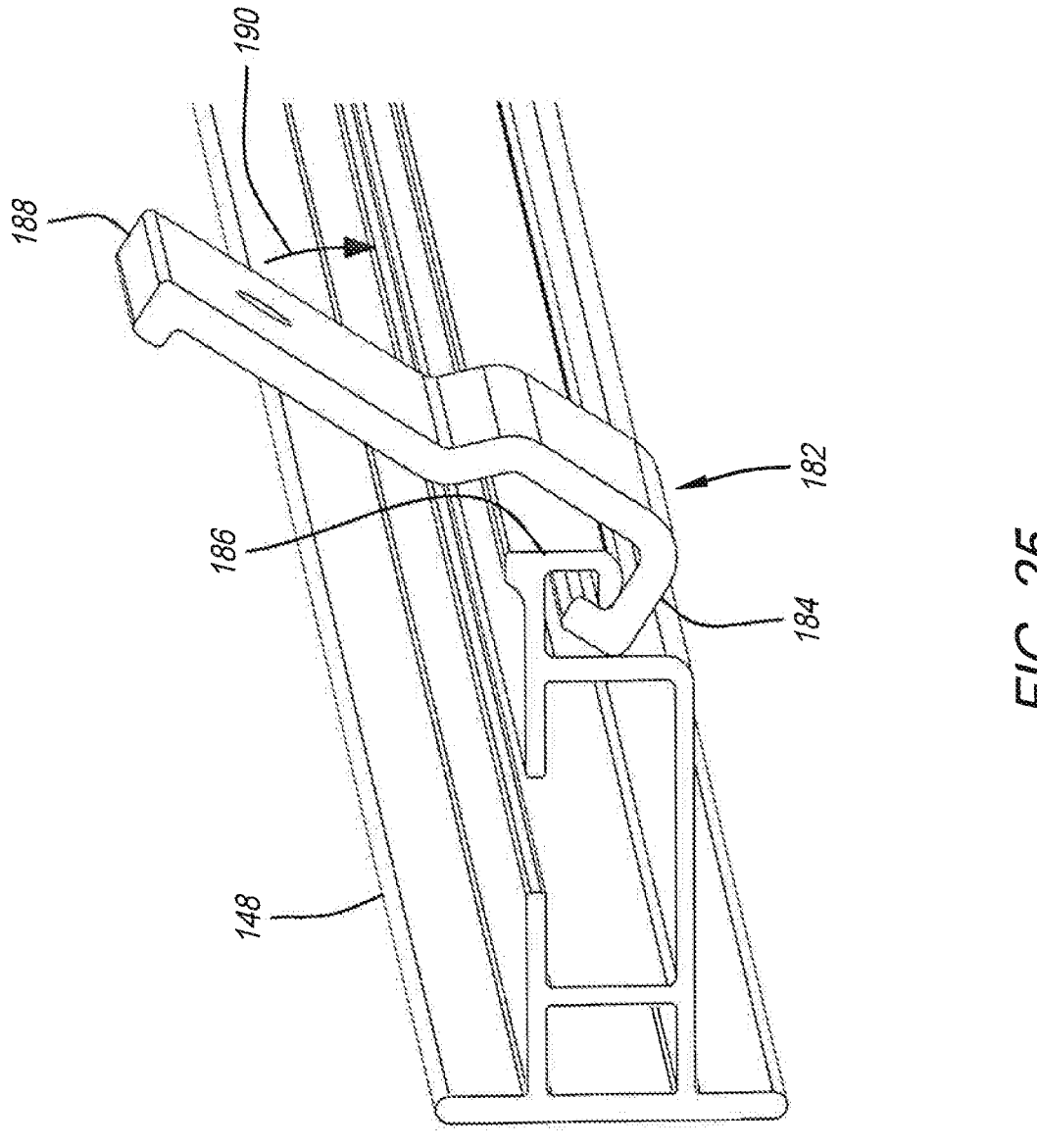
FIG. 25 is a perspective view of a portion of a tonneau cover rail with a clamp.
Figure 26:
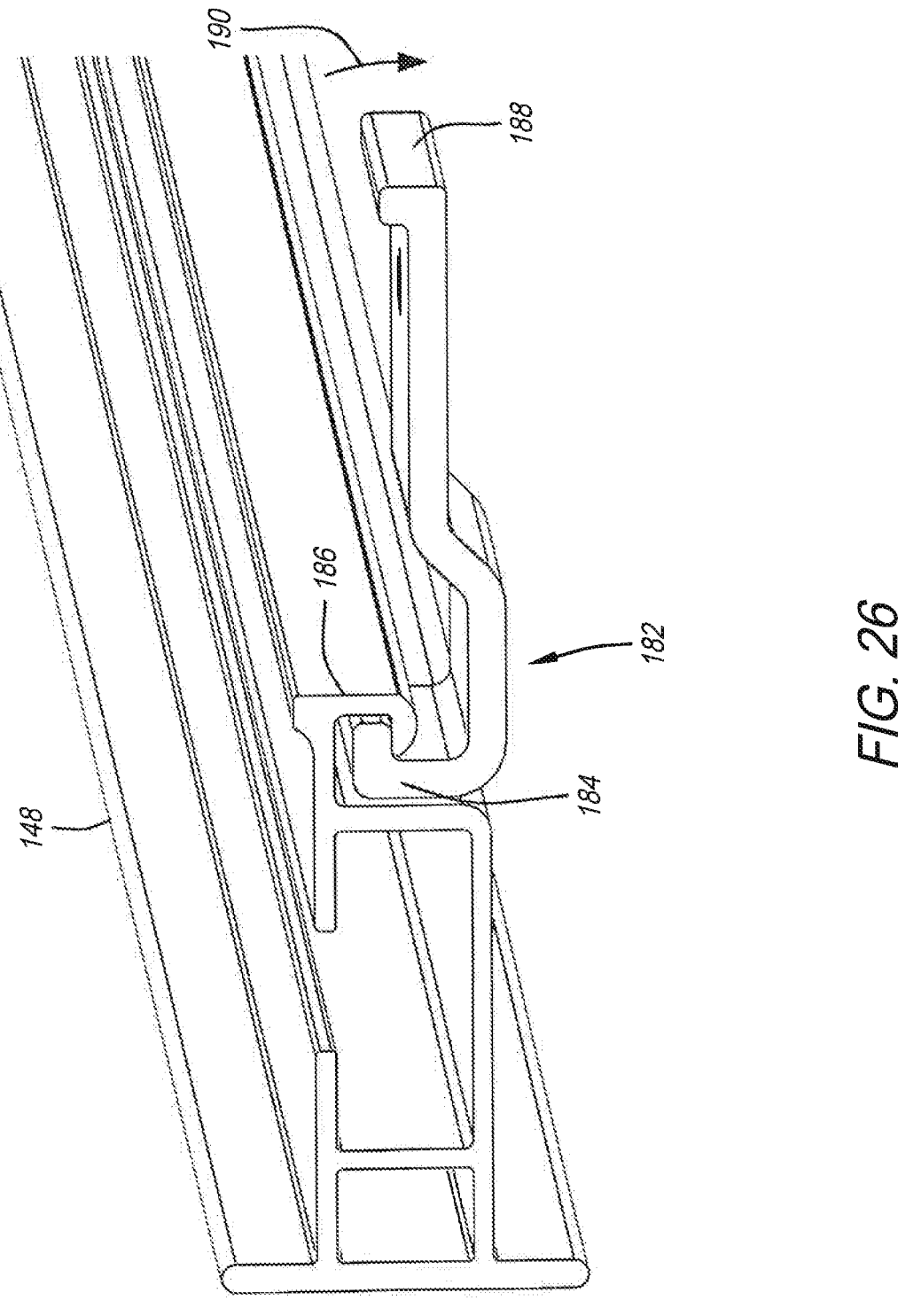
FIG. 26 is another perspective view of a portion of a tonneau cover rail with a clamp.

Another illustrative embodiment of the present disclosure includes a C-clamp 182 that may be engageable with inner rail 148 to secure tonneau cover panel 132, such as bulkhead panel 136, to the inner rail 148. The perspective detail views of FIGS. 25 and 26 show C-clamp 182 being coupled to inner rail 148. As shown in FIG. 25, C-clamp 182 has a "C" shape head 184 that engages a clamp hook 186 on the outer periphery of rail 13. Illustratively shown here is an inner rail. It is appreciated that such clamp hooks 186 and C-clamps 182 may be coupled to any other so configured rail. The view in FIG. 26 depicts how C-clamp 182 is fitted in clamp hook 186. With C-clamp end 188 raised, head 184 is fitted into clamp hook 186 of the rail and then rotated downward in direction 190 so that head 184 engages clamp hook 186. C-clamp 182 may then attach to bulkhead panel 136 or other panel to secure same to a rail.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application, then the disclosure from this non-provisional patent application controls.

What is claimed:

1. A tonneau cover assembly comprising:
a cover that includes at least one panel section;
wherein the at least one panel section selectively shrouds at least a portion of an opening of a cargo box;
wherein the at least one panel section is movable with respect to the opening;
wherein the at least one panel has an end locatable adjacent an exterior of the cargo box;
an extension panel coupled to the end of the at least one panel section;
wherein the extension panel is movable between a use position and a stowed position;
wherein when in the use position at least a portion of the extension panel extends from the at least one panel section and the exterior of the cargo box;
wherein when in the stowed position the extension panel is located within the cargo box;
wherein when in the use position an end of the extension panel is located adjacent an end of the at least one panel section;
wherein when in the stowed position the extension panel is located underneath the at least one panel section with the at least one panel located adjacent the exterior of the cargo box and the at least one panel shrouds the at least the portion of the opening of the cargo box; and
at least one support located underneath the extension panel when in the use position and the exterior of the cargo box.

2. The tonneau cover assembly of claim 1, further comprising a hinge coupled to the extension panel and to the at least one panel section.

3. The tonneau cover assembly of claim 1, wherein the extension panel is movable with respect to the at least one panel section between the stowed position and the use position.

4. The tonneau cover assembly of claim 1, further comprising a receiver that holds at least a portion of the at least one support when the extension panel is located in the use position.

5. The tonneau cover assembly of claim 4, wherein the receiver is attached to the cover.

6. The tonneau cover assembly of claim 4, wherein the receiver is configured to attach to a rail that is attached to the cargo box.

7. The tonneau cover assembly of claim 4, wherein the at least one support includes a post that is extendable into the receiver when the extension panel is located in the use position.

8. The tonneau cover assembly of claim 1, further comprising a second support located underneath the extension panel when in the use position, exterior of the cargo box, and spaced apart from the at least one support.

9. The tonneau cover assembly of claim 1, wherein the at least one support is removable from the tonneau cover assembly.

10. The tonneau cover assembly of claim 2, further comprising a release assembly that extends from underneath the at least one panel section adjacent the hinge, wherein the hinge does not interfere with operation of the release assembly.

11. The tonneau cover assembly of claim 1, wherein the at least one panel section is a tailgate panel.

12. The tonneau cover assembly of claim 4, wherein at least a part of the at least one support is extendable from the receiver when the at least one panel section is in the use position and retractable toward the receiver when the at least one panel section is in the stowed position.

13. The tonneau cover assembly of claim 12, wherein the receiver is coupled to the cover.

14. A tonneau cover assembly comprising:
a cover that includes at least one panel section;
wherein the at least one panel section is a tailgate panel;
wherein the tailgate panel selectively shrouds at least a portion of an opening of a cargo box;
wherein the tailgate panel is movable with respect to the opening; and
an extension panel coupled to the tailgate panel;
wherein the extension panel is movable between a use position and a stowed position;
wherein when in the use position at least a portion of the extension panel extends from the tailgate panel and exterior of the cargo box.

15. The tonneau cover assembly of claim 14, wherein when in the stowed position the extension panel is located within the cargo box.

16. The tonneau cover assembly of claim 14, wherein when in the use position an end of the extension panel is located adjacent an end of the tailgate panel.

17. The tonneau cover assembly of claim 14, wherein when in the stowed position the extension panel is located underneath the tailgate panel.

18. The tonneau cover assembly of claim 14, wherein at least one support is located underneath the extension panel when in the use position and exterior of the cargo box.

19. A tonneau cover assembly comprising:
at least one panel section selectively shrouds at least a portion of an opening of a cargo box;

wherein the at least one panel section is movable with
respect to the opening; and an extension panel coupled to the at least one panel
section and is movable between a use position and a
stowed position;

wherein when in the use position at least a portion of the
extension panel extends from the at least one panel
section and exterior of the cargo box;

wherein the extension panel is attachable to the at least
one panel section when in the use position and sepa-
rable from the at least one panel section when in the
stowed position;

wherein the extension panel includes an insert extending
therefrom configured to be received in an insert slot
disposed in a rear periphery of the at least one panel
section.

* * * * *